United States Patent
Jiang et al.

(10) Patent No.: US 12,047,958 B2
(45) Date of Patent: Jul. 23, 2024

(54) METHOD AND DEVICE IN NODES USED FOR WIRELESS COMMUNICATION

(71) Applicants: Qi Jiang, Shanghai (CN); Xiaobo Zhang, Shanghai (CN)

(72) Inventors: Qi Jiang, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 18/242,546

(22) Filed: Sep. 6, 2023

(65) Prior Publication Data
US 2023/0413271 A1    Dec. 21, 2023

Related U.S. Application Data

(63) Continuation of application No. 17/517,729, filed on Nov. 3, 2021, now Pat. No. 11,792,806.

(30) Foreign Application Priority Data

Nov. 4, 2020    (CN) .......................... 202011215761.0

(51) Int. Cl.
*H04W 72/21*  (2023.01)
*H04L 1/1812*  (2023.01)
(Continued)

(52) U.S. Cl.
CPC .......... *H04W 72/21* (2023.01); *H04L 1/1812* (2013.01); *H04L 5/0053* (2013.01); *H04W 72/0446* (2013.01)

(58) Field of Classification Search
CPC .............. H04W 72/21; H04W 72/0446; H04L 1/1812; H04L 5/0053
(Continued)

(56) References Cited

U.S. PATENT DOCUMENTS

| | | | |
|---|---|---|---|
| 2019/0199477 A1 | 6/2019 | Park et al. | |
| 2020/0322109 A1* | 10/2020 | Yu | ........................ H04B 7/0617 |
| 2021/0250944 A1* | 8/2021 | Ji | .......................... H04W 72/21 |

FOREIGN PATENT DOCUMENTS

| | | |
|---|---|---|
| CN | 111435867 A | 7/2020 |
| CN | 111757518 A | 10/2020 |
| WO | 2016163855 A1 | 10/2016 |

OTHER PUBLICATIONS

First Office Action of Chinese patent application No. CN202011215761.0 dated Feb. 3, 2024.
(Continued)

*Primary Examiner* — Chi Tang P Cheng

(57) ABSTRACT

The present disclosure provides a method and device used in nodes for wireless communications. The node firstly receives K information blocks, K being a positive integer greater than 1, each of the K information blocks comprises a first-type index and at least one second-type index; and then receives a first signaling and a second signaling respectively in a first resource set and a second resource set; and transmits first UCI in a physical layer channel on a first cell, the first cell being capable of bearing a HARQ-ACK associated with the first signaling; the first UCI comprises a HARQ-ACK associated with a second signaling. The present disclosure improves the method and device for design of HARQ-ACK codebook grouping to optimize the system performance.

20 Claims, 7 Drawing Sheets

(51) Int. Cl.
*H04L 5/00* (2006.01)
*H04W 72/0446* (2023.01)

(58) Field of Classification Search
USPC .......................................... 370/329
See application file for complete search history.

(56) References Cited

OTHER PUBLICATIONS

First Search Report of Chinese patent application No. CN202011215761.0 dated Feb. 1, 2024.

\* cited by examiner

METHOD AND DEVICE IN NODES USED FOR WIRELESS COMMUNICATION

CROSS REFERENCE TO RELATED APPLICATIONS

This application is the continuation of the U.S. patent application Ser. No. 17/517,729, field on Nov. 3, 2021, claims the priority benefit of Chinese Patent Application No. 202011215761.0, filed on Nov. 4, 2020, the full disclosure of which is incorporated herein by reference.

BACKGROUND

Technical Field

The present disclosure relates to transmission methods and devices in wireless communication systems, and in particular to a designing scheme and device for uplink (UL) feedback in wireless communications.

Related Art

In 5G New Radio (NR), Massive Multi-Input Multi-Output (MIMO) is a key technology. In Massive MIMO, multiple antennas form through beamforming a narrow beam pointing in a specific direction to enhance communication quality. In 5G NR, a base station configures a control signaling and beam transmission properties of a data channel through Transmission Configuration Indication (TCI). For the control signaling, the base station can indicate a TCI State employed when blind detecting a corresponding Control Resource Set (CORESET) through Medium Access Control (MAC) Control Elements (CE); as for the data channel, the base station can activate a plurality of TCI-States through the MAC CE, and, through Downlink Control Information (DCI), dynamically indicates that one of the TCI-States is applied in transmission of a Physical Downlink Shared Channel (PDSCH), thus adjusting a receive (Rx) beam in a dynamic manner.

In NR R16, a Control Resource Set Pool Index is introduced targeting a Multi-TRP scenario, and Hybrid Automatic Repeat reQuest Acknowledgement (HARQ-ACK) Codebooks are grouped corresponding to different CORESETPoolIndexes, only HARQ-ACKs for data channels scheduled in control resource sets that belong to a same control resource set pool can be fed back in a HARQ-ACK codebook, while the feedback of data channels scheduled by control signalings that belong to different control resource set pools shall be separately performed. The above method turns out more robust than combined feedback, for it won't result in the dropping of HARQ-ACK information on two TRPs due to the blockage of beams from one of these TRPs.

SUMMARY

Inventors find through researches that beam-based communications will have negative influence on inter-cell handover, such as extra delay and pingpong effect. In the meantime, since the update of CORESET configuration needs to go through resetting of a Radio Resource Control (RRC) signaling, which may lead to a consequence that, when a terminal moves back and forth between multiple beams of multiple cells, a large delay will be incurred in the Handover (HO) of a traditional Layer 3, thus reducing the system efficiency. In view of the above issues, the current inter-cell mobility management on L1/2 is under discussion. Under such circumstances, a simple scheme of reducing delay is to associate a CORESET with multiple cells simultaneously, and the terminal can receive control signalings from multiple cells in this CORESET. Based on the scenarios, a problem to be solved is how a terminal determines the grouping of HARQ-ACK codebook on the condition of a CORESET being associated with multiple cells, and the issue of interpreting of corresponding Downlink Assignment Index (DAI).

To address the above problem, the present disclosure provides a solution. It should be noted that though the present disclosure only took the massive MIMO and beam-based communications as a typical or exemplary scenario in the statement above, it is also applicable to other scenarios such as LTE multi-antenna system, where similar technical effects can be achieved. Additionally, the adoption of a unified solution for various scenarios, including but not limited to massive MIMO, beam-based communications, and LTE multi-antenna system, contributes to the reduction of hardcore complexity and costs. The embodiments of any node and the characteristics in the embodiments may be applied to any other node, and vice versa. In the case of no conflict, the embodiments of the present disclosure and the characteristics in the embodiments may be combined with each other arbitrarily.

To address the above problem, the present disclosure provides a method and a device for determining HARQ-ACK codebook for multi-TRP under the L1/2 mobility management. It should be noted that without conflict, embodiments in the User Equipment (UE) in the present disclosure and the characteristics of the embodiments are also applicable to a base station, and vice versa. In case of no conflict, though the present disclosure is originally targeted at cellular networks, it is also applicable to Internet of Things (IoT) and Vehicle-to-Everything (V2X). Besides, though originally targeted at multi-carrier communications, the present disclosure can also be used for single-carrier communications. Further, though originally targeted at multi-antenna communications, the present disclosure can also be used for single-antenna communications. And the present disclosure not only applies to terminal-base station scenarios, but also to terminal-terminal ones, terminal-relay ones, Non-Terrestrial Networks (NTN) as well as relay-base station communications, where similar technical effects can be achieved. Additionally, the adoption of a unified solution for various scenarios, including but not limited to terminal-base station scenarios, contributes to the reduction of hardcore complexity and costs.

Furthermore, if no conflict is incurred, embodiments in the first node in the present disclosure and the characteristics of the embodiments are also applicable to a second node, and vice versa. Particularly, for interpretations of the terminology, nouns, functions and variants (unless otherwise specified) in the present disclosure, refer to definitions given in TS36 series, TS38 series and TS37 series of 3GPP specifications.

The present disclosure provides a method in a first node for wireless communications, comprising:
  receiving K information blocks, K being a positive integer greater than 1, each of the K information blocks comprises a first-type index and at least one second-type index, and each of the K information blocks is used for indicating a resource set;
  receiving a first signaling and a second signaling respectively in a first resource set and a second resource set; the first resource set is the resource set indicated by a first information block, the first information block being one of the K information blocks, and the second resource set is the resource set indicated by a second information block, the second information block being one of the K information blocks other than the first information block; and transmitting first UCI in a physical layer channel on a first cell, the first cell being capable of bearing a HARQ-ACK associated with the first signaling;

herein, the first-type index's name comprises CORESET-PoolIndex; any said second-type index comprised in the K information blocks indicates a reference signal resource; a Demodulation Reference Signal (DMRS) of a channel occupied by the first signaling and a first reference signal resource are quasi co-located (QCL), and one said second-type index comprised in the first information block indicates the first reference signal resource; a DMRS of a channel occupied by the second signaling and a second reference signal resource are QCL, and one said second-type index comprised in the second information block indicates the second reference signal resource; the first reference signal resource is associated with a target cell, while the second reference signal resource is associated with a first candidate cell; the first UCI comprises a HARQ-ACK associated with a second signaling, the first-type index indicated by the first information block and the target cell are jointly used to determine whether the first UCI comprises the HARQ-ACK associated with the first signaling; the first signaling comprises a first field, and the second signaling comprises a second field; the second field in the second signaling is used to determine a number of HARQ-ACK bits that are comprised in the first UCI; whether the first field in the first signaling is used to determine the number of the HARQ-ACK bits that are comprised in the first UCI depends on the first-type index indicated by the first information block and the target cell.

In one embodiment, a technical feature of the above method is that: according to the current system, when a first-type index adopted by the first resource set is the same as a first-type index adopted by the second resource set, namely, the first resource set and the second resource set adopt a same CORESETPoolIndex, a HARQ-ACK associated with a first signaling and a HARQ-ACK associated with a second signaling will employ a same HARQ-ACK codebook, and the first field in the first signaling, i.e., DAI field, can be used combined with the second field in the second signaling, i.e., DAI field, for determining a number of HARQ-ACK bits in the first UCI; and then in the L1/2 mobility, the first resource set and the second resource set are likely to be belonging to different cells, or Quasi Colocated with reference signal resources associated with different cells, thus it will be insufficient to determine HARQ-ACK codebook partition only in accordance with the CORESETPoolIndex. The method provided above also includes the target cell with which the first reference signal resource is associated into HARQ-ACK codebook partition and the decision standard for DAI interpretation.

According to one aspect of the present disclosure, comprising:

receiving a third information block, the third information block being used to indicate a said second-type index comprised in the first information block.

In one embodiment, the above method is characterized in that the third information block is used to activate a TCI-State adopted in receiving the first resource set.

According to one aspect of the present disclosure, comprising:

transmitting a first uplink (UL) information block, the UL information block being used to indicate a said second-type index comprised in the first information block.

In one embodiment, the above method is characterized in that the first node recommends a TCI-State adopted by transmitting the first resource set directly to a transmitter of the first signaling, thus facilitating the reception of the first node.

According to one aspect of the present disclosure, comprising:

receiving a fourth information block, the fourth information block being used to indicate a said second-type index comprised in the second information block.

In one embodiment, the above method is characterized in that the fourth information block is used to activate a TCI-State adopted in receiving the second resource set.

According to one aspect of the present disclosure, comprising:

transmitting a second UL information block, the second UL information block being used to indicate a said second-type index comprised in the second information block.

In one embodiment, the above method is characterized in that the first node recommends a TCI-State adopted by transmitting the second resource set directly to a transmitter of the first signaling, thus facilitating the reception of the first node.

According to one aspect of the present disclosure, comprising:

receiving a first radio signal and a second radio signal;

herein, the first signaling comprises configuration information of the first radio signal, and the HARQ-ACK associated with the first signaling indicates whether a bit block carried by the first radio signal is correctly decoded; the second signaling comprises configuration information of the second radio signal, and the HARQ-ACK associated with the second signaling indicates whether a bit block carried by the second radio signal is correctly decoded.

According to one aspect of the present disclosure, a time-domain resource occupied by the first UCI is a reference time-domain resource for a HARQ-ACK associated with the second signaling.

According to one aspect of the present disclosure, the first-type index comprised in the first information block is the same as the first-type index comprised in the second information block; all conditions in a first condition set being fulfilled is used to determine that the first field in the first signaling is not used to determine the number of the HARQ-ACK bits comprised in the first UCI; the first condition set comprises: the first candidate cell is different from the target cell.

In one embodiment, the above method is characterized in that even though the first resource set and the second resource set adopt a same CORESETPoolIndex, when a reference signal resource QCL with the first resource set and a reference signal resource QCL with the second resource set respectively belong to different cells, a HARQ-ACK associated with a control signaling transmitted in the first resource set and a HARQ-ACK associated with a control signaling transmitted in the second resource set shall be sent for feedback separately, thus a DAI field in the first signaling won't affect the number of HARQ-ACK bits in the first UCI.

In one embodiment, the essence of the above method lies in that when the first node adopts beams of two different cells respectively to receive the first resource set and the second resource set, a HARQ-ACK associated with a control signaling transmitted in the first resource set and a HARQ-ACK associated with a control signaling transmitted in the second resource set shall be sent for feedback separately, and DAI cannot be calculated in combination.

According to one aspect of the present disclosure, the first condition set comprises: there aren't two information blocks among the K information blocks that respectively comprise two second-type indexes indicating a same reference signal resource associated with the target cell, with the first-type indexes respectively comprised in the two information blocks being different.

In one embodiment, the essence of the above method lies in that there won't be two CORESETs adopting different CORESETPoolIndexes to be associated with a reference signal resource under a same cell, thus avoiding potential ambiguity in which beam the first node shall be adopting to receive the Control Resource Set (CORESET).

According to one aspect of the present disclosure, HARQ-ACKs associated with all downlink physical layer signalings of the target cell are not fed back respectively.

In one embodiment, the essence of the above method lies in that the target cell only comprises one CORESETPool, or the target cell is not configured with such CORESETPool.

According to one aspect of the present disclosure, an offset between reception of the first signaling and the first radio signal is smaller than a first offset value; a DMRS comprised by the first radio signal and a DMRS comprised by a control resource set with a minimum control resource set index in a first target control resource set pool are QCL; the first target control resource set pool comprises a control resource set indicated by any information block in a first information block subset; the first information block subset comprises a first target information block, and the first target information block is any one of information blocks that fulfill a first target condition set among the K information blocks; the first target condition set comprises that a first-type index comprised in the first target information block is the same as the first-type index comprised in the first information block; and the first target condition set comprises that the first target information block comprises at least one second-type index, and a reference signal resource indicated by the second-type index comprised in the first target information block is associated with the target cell.

In one embodiment, the essence of the above method lies in that when the first UCI does not comprise the HARQ-ACK associated with the first signaling, and an offset value between the control channel and data channel is smaller, a CORESET to which a beam employed by receiving the first radio signal refers shall adopt a same CORESETPoolIndex as a CORESET Pool to which the first resource set belongs, and the referred CORESET can be associated with a reference signal resource under the target cell.

According to one aspect of the present disclosure, the first-type index comprised in the first information block is different from the first-type index comprised in the second information block; all conditions in a second condition set being fulfilled is used to determine that the first field in the first signaling is used to determine the number of the HARQ-ACK bits comprised in the first UCI; the second condition set comprises: the first candidate cell is the same as the target cell.

In one embodiment, the essence of the above method lies in that even though the first resource set and the second resource set adopt different CORESETPoolIndexes, when a reference signal resource QCL with the first resource set and a reference signal resource QCL with the second resource set belong to a same cell, a HARQ-ACK associated with the first signaling and a HARQ-ACK associated with a second signaling can employ a same HARQ-ACK codebook, and a DAI field in the first signaling and a DAI field in the second signaling can be jointly calculated to determine the number of HARQ-ACK bits comprised in the first UCI.

According to one aspect of the present disclosure, the second condition set comprises: there are two information blocks among the K information blocks that respectively comprise two second-type indexes indicating a same reference signal resource associated with the target cell, with the first-type indexes respectively comprised in the two information blocks being different.

According to one aspect of the present disclosure, an offset between reception of the first signaling and the first radio signal is smaller than a first offset value; a DMRS comprised by the first radio signal and a DMRS comprised by a control resource set with a minimum control resource set index in a second target control resource set pool are QCL; the second target control resource set pool comprises a control resource set indicated by any information block in a second information block subset; the second information block subset comprises a second target information block, and the second target information block is any one of information blocks that fulfill a second target condition set among the K information blocks; the second target condition set comprises that the second target information block comprises at least one second-type index, and a reference signal resource indicated by the second-type index comprised in the second target information block is associated with the target cell.

In one embodiment, the essence of the above method lies in that when the first UCI comprises the HARQ-ACK associated with the first signaling, and an offset value between the control channel and data channel is smaller, a CORESET to which a beam employed by receiving the first radio signal refers is only required to be associated with a reference signal resource under the target cell.

According to one aspect of the present disclosure, comprising:
receiving a fifth information block;
when the first UCI does not comprise the HARQ-ACK associated with the first signaling, transmitting target UCI in a target time-domain resource set;
herein, the fifth information block is used to determine a position of a time-domain resource occupied by the target time-domain resource set, and the target UCI comprises the HARQ-ACK associated with the first signaling; a time-domain resource occupied by the target time-domain resource set and a time-domain resource occupied by the first UCI are orthogonal; the first field in the first signaling is used to determine a number of HARQ-ACK bits that are comprised in the target UCI.

The present disclosure provides a method in a second node for wireless communications, comprising:
transmitting K information blocks, K being a positive integer greater than 1, each of the K information blocks comprises a first-type index and at least one second-type index, and each of the K information blocks is used for indicating a resource set;
transmitting a first signaling and a second signaling respectively in a first resource set and a second resource set; the first resource set is the resource set indicated by a first information block, the first information block being one of the K information blocks, and the second resource set is the resource set indicated by a second information block, the second information block being one of the K information blocks other than the first information block; and receiving first UCI in a physical layer channel on a first cell, the first cell being capable of bearing a HARQ-ACK associated with the first signaling;

herein, the first-type index's name comprises CORESET-PoolIndex; any said second-type index comprised in the K information blocks indicates a reference signal resource; a Demodulation Reference Signal (DMRS) of a channel occupied by the first signaling and a first reference signal resource are quasi co-located (QCL), and one said second-type index comprised in the first information block indicates the first reference signal resource; a DMRS of a channel occupied by the second signaling and a second reference signal resource are QCL, and one said second-type index comprised in the second information block indicates the second reference signal resource; the first reference signal resource is associated with a target cell, while the second reference signal resource is associated with a first candidate cell; the first UCI comprises a HARQ-ACK associated with a second signaling, the first-type index indicated by the first information block and the target cell are jointly used to determine whether the first UCI comprises the HARQ-ACK associated with the first signaling; the first signaling comprises a first field, and the second signaling comprises a second field; the second field in the second signaling is used to determine a number of HARQ-ACK bits that are comprised in the first UCI; whether the first field in the first signaling is used to determine the number of the HARQ-ACK bits that are comprised in the first UCI depends on the first-type index indicated by the first information block and the target cell.

According to one aspect of the present disclosure, comprising:

transmitting a third information block, the third information block being used to indicate a said second-type index comprised in the first information block.

According to one aspect of the present disclosure, comprising:

receiving a first uplink (UL) information block, the UL information block being used to indicate a said second-type index comprised in the first information block.

According to one aspect of the present disclosure, comprising:

receiving a fourth information block, the fourth information being used to indicate a said second-type index comprised in the second information block.

According to one aspect of the present disclosure, comprising:

receiving a second UL information block, the second UL information block being used to indicate a said second-type index comprised in the second information block.

According to one aspect of the present disclosure, comprising:

transmitting a first radio signal and a second radio signal;
herein, the first signaling comprises configuration information of the first radio signal, and the HARQ-ACK associated with the first signaling indicates whether a bit block carried by the first radio signal is correctly decoded; the second signaling comprises configuration information of the second radio signal, and the HARQ-ACK associated with the second signaling indicates whether a bit block carried by the second radio signal is correctly decoded.

According to one aspect of the present disclosure, a time-domain resource occupied by the first UCI is a reference time-domain resource for a HARQ-ACK associated with the second signaling.

According to one aspect of the present disclosure, the first-type index comprised in the first information block is the same as the first-type index comprised in the second information block; all conditions in a first condition set being fulfilled is used to determine that the first field in the first signaling is not used to determine the number of the HARQ-ACK bits comprised in the first UCI; the first condition set comprises: the first candidate cell is different from the target cell.

According to one aspect of the present disclosure, the first condition set comprises: there aren't two information blocks among the K information blocks that respectively comprise two second-type indexes indicating a same reference signal resource associated with the target cell, with the first-type indexes respectively comprised in the two information blocks being different.

According to one aspect of the present disclosure, HARQ-ACKs associated with all downlink physical layer signalings of the target cell are not fed back respectively.

According to one aspect of the present disclosure, an offset between reception of the first signaling and the first radio signal is smaller than a first offset value; a DMRS comprised by the first radio signal and a DMRS comprised by a control resource set with a minimum control resource set index in a first target control resource set pool are QCL; the first target control resource set pool comprises a control resource set indicated by any information block in a first information block subset; the first information block subset comprises a first target information block, and the first target information block is any one of information blocks that fulfill a first target condition set among the K information blocks; the first target condition set comprises that a first-type index comprised in the first target information block is the same as the first-type index comprised in the first information block; and the first target condition set comprises that the first target information block comprises at least one second-type index, and a reference signal resource indicated by the second-type index comprised in the first target information block is associated with the target cell.

According to one aspect of the present disclosure, the first-type index comprised in the first information block is different from the first-type index comprised in the second information block; all conditions in a second condition set being fulfilled is used to determine that the first field in the first signaling is used to determine the number of the HARQ-ACK bits comprised in the first UCI; the second condition set comprises: the first candidate cell is the same as the target cell.

According to one aspect of the present disclosure, the second condition set comprises: there are two information blocks among the K information blocks that respectively comprise two second-type indexes indicating a same reference signal resource associated with the target cell, with the first-type indexes respectively comprised in the two information blocks being different.

According to one aspect of the present disclosure, an offset between reception of the first signaling and the first radio signal is smaller than a first offset value; a DMRS comprised by the first radio signal and a DMRS comprised by a control resource set with a minimum control resource set index in a second target control resource set pool are QCL; the second target control resource set pool comprises a control resource set indicated by any information block in a second information block subset; the second information block subset comprises a second target information block, and the second target information block is any one of information blocks that fulfill a second target condition set among the K information blocks; the second target condition set comprises that the second target information block comprises at least one second-type index, and a reference signal resource indicated by the second-type index comprised in the second target information block is associated with the target cell.

According to one aspect of the present disclosure, comprising:

transmitting a fifth information block;

when the first UCI does not comprise the HARQ-ACK associated with the first signaling, transmitting target UCI in a target time-domain resource set;

herein, the fifth information block is used to determine a position of a time-domain resource occupied by the target time-domain resource set, and the target UCI comprises the HARQ-ACK associated with the first signaling; a time-domain resource occupied by the target time-domain resource set and a time-domain resource occupied by the first UCI are orthogonal; the first field in the first signaling is used to determine a number of HARQ-ACK bits that are comprised in the target UCI.

The present disclosure provides a first node for wireless communications, comprising:

a first receiver, receiving K information blocks, K being a positive integer greater than 1, each of the K information blocks comprises a first-type index and at least one second-type index, and each of the K information blocks is used for indicating a resource set;

a first transceiver, receiving a first signaling and a second signaling respectively in a first resource set and a second resource set; the first resource set is the resource set indicated by a first information block, the first information block being one of the K information blocks, and the second resource set is the resource set indicated by a second information block, the second information block being one of the K information blocks other than the first information block; and a first transmitter, transmitting first UCI in a physical layer channel on a first cell, the first cell being capable of bearing a HARQ-ACK associated with the first signaling;

herein, the first-type index's name comprises CORESET-PoolIndex; any said second-type index comprised in the K information blocks indicates a reference signal resource; a Demodulation Reference Signal (DMRS) of a channel occupied by the first signaling and a first reference signal resource are quasi co-located (QCL), and one said second-type index comprised in the first information block indicates the first reference signal resource; a DMRS of a channel occupied by the second signaling and a second reference signal resource are QCL, and one said second-type index comprised in the second information block indicates the second reference signal resource; the first reference signal resource is associated with a target cell, while the second reference signal resource is associated with a first candidate cell; the first UCI comprises a HARQ-ACK associated with a second signaling, the first-type index indicated by the first information block and the target cell are jointly used to determine whether the first UCI comprises the HARQ-ACK associated with the first signaling; the first signaling comprises a first field, and the second signaling comprises a second field; the second field in the second signaling is used to determine a number of HARQ-ACK bits that are comprised in the first UCI; whether the first field in the first signaling is used to determine the number of the HARQ-ACK bits that are comprised in the first UCI depends on the first-type index indicated by the first information block and the target cell.

The present disclosure provides a second node for wireless communications, comprising:

a second transmitter, transmitting K information blocks, K being a positive integer greater than 1, each of the K information blocks comprises a first-type index and at least one second-type index, and each of the K information blocks is used for indicating a resource set;

a second transceiver, transmitting a first signaling and a second signaling respectively in a first resource set and a second resource set; the first resource set is the resource set indicated by a first information block, the first information block being one of the K information blocks, and the second resource set is the resource set indicated by a second information block, the second information block being one of the K information blocks other than the first information block; and a second receiver, receiving first UCI in a physical layer channel on a first cell, the first cell being capable of bearing a HARQ-ACK associated with the first signaling;

herein, the first-type index's name comprises CORESET-PoolIndex; any said second-type index comprised in the K information blocks indicates a reference signal resource; a Demodulation Reference Signal (DMRS) of a channel occupied by the first signaling and a first reference signal resource are quasi co-located (QCL), and one said second-type index comprised in the first information block indicates the first reference signal resource; a DMRS of a channel occupied by the second signaling and a second reference signal resource are QCL, and one said second-type index comprised in the second information block indicates the second reference signal resource; the first reference signal resource is associated with a target cell, while the second reference signal resource is associated with a first candidate cell; the first UCI comprises a HARQ-ACK associated with a second signaling, the first-type index indicated by the first information block and the target cell are jointly used to determine whether the first UCI comprises the HARQ-ACK associated with the first signaling; the first signaling comprises a first field, and the second signaling comprises a second field; the second field in the second signaling is used to determine a number of HARQ-ACK bits that are comprised in the first UCI; whether the first field in the first signaling is used to determine the number of the HARQ-ACK bits that are comprised in the first UCI depends on the first-type index indicated by the first information block and the target cell.

In one embodiment, compared with the prior art, the present disclosure is advantageous in the following aspects:

according to the existing system, when a first-type index adopted by the first resource set is the same as a first-type index adopted by the second resource set, namely, a same CORESETPoolIndex is adopted by the first resource set and the second resource set, the HARQ-ACK associated with the first signaling and that associated with the second signaling can employ a same HARQ-ACK codebook; in the L1/2 mobility management, the first resource set and the second resource set may belong to different cells, or may be QCL with reference signal resources associated with different cells, so, determining the HARQ-ACK codebook partition only according to the CORESETPoolIndex is inadequate, and the method above-mentioned also includes the target cell associated with the first reference signal resource into HARQ-ACK codebook partition, as well as the decision standard for interpretation of the DAI field in the first signaling;

when the first resource set and the second resource set adopt a same CORESETPoolIndex, and a reference signal resource QCL with the first resource set and a reference signal resource QCL with the second resource set respectively belong to different cells, a HARQ-ACK associated with a control signaling transmitted in the first resource set and a HARQ-ACK associated with a control signaling transmitted in the second resource set still need to be fed back separately, and DAIs are required to be counted separately;

when the first UCI does not comprise a HARQ-ACK associated with the first signaling, and an offset value between the control channel and data channel is smaller, a CORESET as a necessary reference for a beam employed for receiving the first signaling shall adopt a same CORESETPoolIndex as a CORESET Pool to which the first resource set belongs, and the CORESET referred to can be associated with a reference signal resource under the target cell;

further optimization will be provided in accordance with the partition of HARQ-ACK codebook in the case when a gap between a scheduling signaling and a Physical Downlink Shared Channel (PDSCH) is too small, and beams of the PDSCH are backup to corresponding CORESETs according to the HARQ-ACK codebook partition situation, thus enhancing the performance;

when the first UCI does not comprise a HARQ-ACK associated with the first signaling, the HARQ-ACK associated with the first signaling will be deferred for transmission on other time-domain resources to ensure performance.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
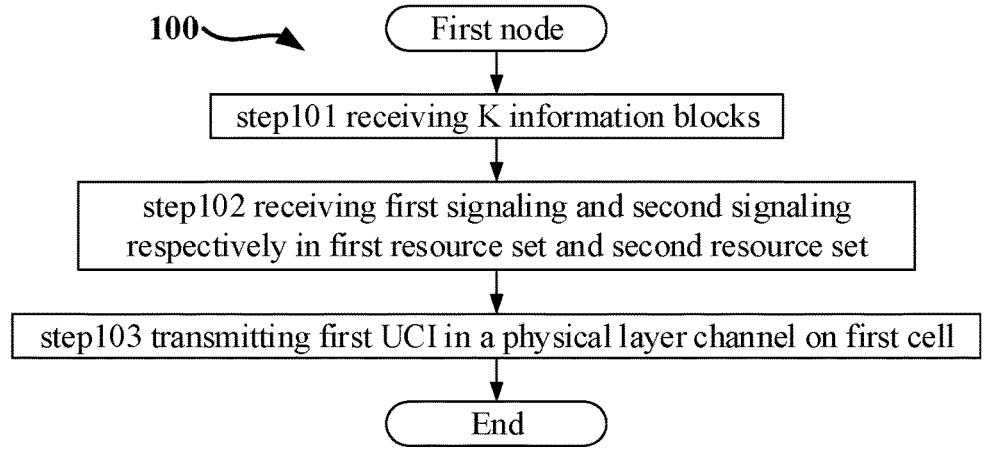
FIG. 1 illustrates a flowchart of processing of a first node according to one embodiment of the present disclosure.

Embodiment 1 illustrates a flowchart of processing of a first node, as shown in FIG. 1. In 100 illustrated by FIG. 1, each box represents a step. In Embodiment 1, a first node in the present disclosure receives K information blocks in step 101; receives a first signaling and a second signaling respectively in a first resource set and a second resource set in step 102; and transmits first UCI in a physical layer channel on a first cell in step 103.

In Embodiment 1, K is a positive integer greater than 1, each of the K information blocks comprises a first-type index and at least one second-type index, and each of the K information blocks is used for indicating a resource set; the first resource set is the resource set indicated by a first information block, the first information block being one of the K information blocks, and the second resource set is the resource set indicated by a second information block, the second information block being one of the K information blocks other than the first information block; the first cell is capable of bearing a HARQ-ACK associated with the first signaling; any said second-type index comprised in the K information blocks indicates a reference signal resource; a Demodulation Reference Signal (DMRS) of a channel occupied by the first signaling and a first reference signal resource are quasi co-located (QCL), and one said second-type index comprised in the first information block indicates the first reference signal resource; a DMRS of a channel occupied by the second signaling and a second reference signal resource are QCL, and one said second-type index comprised in the second information block indicates the second reference signal resource; the first reference signal resource is associated with a target cell, while the second reference signal resource is associated with a first candidate cell; the first UCI comprises a HARQ-ACK associated with a second signaling, the first-type index indicated by the first information block and the target cell are jointly used to determine whether the first UCI comprises the HARQ-ACK associated with the first signaling; the first signaling comprises a first field, and the second signaling comprises a second field; the second field in the second signaling is used to determine a number of HARQ-ACK bits that are comprised in the first UCI; whether the first field in the first signaling is used to determine the number of the HARQ-ACK bits that are comprised in the first UCI depends on the first-type index indicated by the first information block and the target cell.

In one embodiment, when the first-type index indicated by the first information block is the same as a second-type index comprised in the second information block, and the first candidate cell is different from the target cell; the first field in the first signaling is not used to determine the number of HARQ-ACK bits comprised in the first UCI.

In one embodiment, when the first-type index indicated by the first information block is different from a second-type index comprised in the second information block, and the first candidate cell is different from the target cell; the first field in the first signaling is not used to determine the number of HARQ-ACK bits comprised in the first UCI.

In one embodiment, when the first-type index indicated by the first information block is the same as a second-type index comprised in the second information block, and the first candidate cell is the same as the target cell; the first field in the first signaling is used to determine the number of HARQ-ACK bits comprised in the first UCI.

In one embodiment, when the first-type index indicated by the first information block is different from a second-type index comprised in the second information block, and the first candidate cell is the same as the target cell; the first field in the first signaling is used to determine the number of HARQ-ACK bits comprised in the first UCI.

In one embodiment, when the first-type index indicated by the first information block is equal to 0, and the first candidate cell is the same as the target cell; the first field in the first signaling is used to determine the number of HARQ-ACK bits comprised in the first UCI.

In one embodiment, when the first-type index indicated by the first information block is unequal to 0, and the first candidate cell is the same as the target cell; the first field in the first signaling is not used to determine the number of HARQ-ACK bits comprised in the first UCI.

In one embodiment, when the first-type index indicated by the first information block is disable, and the first candidate cell is the same as the target cell; the first field in the first signaling is used to determine the number of HARQ-ACK bits comprised in the first UCI.

In one embodiment, when the first-type index indicated by the first information block is enable, and the first candidate cell is the same as the target cell; the first field in the first signaling is not used to determine the number of HARQ-ACK bits comprised in the first UCI.

In one embodiment, when the first-type index indicated by the first information block is equal to 0, and the first candidate cell is a secondary cell of the first node; the first field in the first signaling is used to determine the number of HARQ-ACK bits comprised in the first UCI.

In one embodiment, when the first-type index indicated by the first information block is equal to 0, and the first candidate cell is a primary cell of the first node; the first field in the first signaling is not used to determine the number of HARQ-ACK bits comprised in the first UCI.

In one embodiment, the first node determines whether the first field in the first signaling is used to determine the number of the HARQ-ACK bits comprised in the first UCI according to the first-type index indicated by the first information block and the target cell.

In one embodiment, when the first UCI comprises a HARQ-ACK associated with the first signaling, the first field in the first signaling and the second field in the second signaling are jointly used to determine a number of HARQ-ACK bits comprised in the first UCI.

In one subembodiment, when the first UCI comprises a HARQ-ACK associated with the first signaling, the first UCI comprises a first HARQ-ACK bit group and a second HARQ-ACK bit group, of which the first HARQ-ACK bit group is used to indicate a HARQ-ACK of the first signaling, and the second HARQ-ACK bit group is used to indicate a HARQ-ACK of the second signaling.

In one subsidiary embodiment of the above subembodiment, the first HARQ-ACK bit group comprises one bit.

In one subsidiary embodiment of the above subembodiment, the second HARQ-ACK bit group comprises one bit.

In one subsidiary embodiment of the above subembodiment, the first HARQ-ACK bit group comprises more than one bit.

In one subsidiary embodiment of the above subembodiment, the second HARQ-ACK bit group comprises more than one bit.

In one subembodiment, the first field in the first signaling comprises a first sub-field, and the second field in the second signaling comprises a second sub-field, the first sub-field is used to indicate L1 HARQ processes, and the second sub-field is used to indicate L2 HARQ processes, L1 and L2 both being positive integers greater than 1, the number of HARQ-ACK bits comprised in the first UCI being equal to a sum of L1 and L2.

In one subembodiment, the first field in the first signaling comprises a first sub-field, and the second field in the second signaling comprises a second sub-field; the first field is a DAI field, and the first sub-field is a Total DAI in the DAI field; the second field is a DAI field, and the second sub-field is a Total DAI in the DAI field.

In one embodiment, when the first UCI does not comprise the HARQ-ACK associated with the first signaling, of the first field in the first signaling and the second field in the second signaling only the second field in the second signaling is used to determine the number of HARQ-ACK bits comprised in the first UCI.

In one embodiment, when the first UCI does not comprise the HARQ-ACK associated with the first signaling, the first field in the first signaling is not used to determine the number of HARQ-ACK bits comprised in the first UCI.

In one subembodiment of the above two embodiments, when the first UCI does not comprise the HARQ-ACK associated with the first signaling, the first UCI indicates a HARQ-ACK of the second signaling, and the first UCI does not indicate a HARQ-ACK of the first signaling.

In one subembodiment of the above two embodiments, the first field in the first signaling comprises a first sub-field, and the second field in the second signaling comprises a second sub-field, the first sub-field is used to indicate L1 HARQ processes, and the second sub-field is used to indicate L2 HARQ processes, L1 and L2 both being positive integers greater than 1, the number of HARQ-ACK bits comprised in the first UCI being equal to L2.

In one subembodiment of the above two embodiments, the first field in the first signaling comprises a first sub-field, and the second field in the second signaling comprises a second sub-field; the first field is a DAI field, and the first sub-field is a Total DAI in the DAI field; the second field is a DAI field, and the second sub-field is a Total DAI in the DAI field.

In one subembodiment of the above two embodiments, the HARQ-ACK of the first signaling is deferred for transmission.

In one subembodiment of the above two embodiments, the HARQ-ACK of the first signaling is dropped.

In one embodiment, the first signaling is DCI, and the first field in the first signaling is a DAI in the DCI.

In one embodiment, the second signaling is DCI, and the second field in the second signaling is a DAI in the DCI.

In one embodiment, the first signaling is DCI, and the first field in the first signaling is a Total DAI in the DCI.

In one embodiment, the second signaling is DCI, and the second field in the second signaling is a Total DAI in the DCI.

In one embodiment, the first signaling is DCI, and the first field in the first signaling is a Counter DAI in the DCI.

In one embodiment, the second signaling is DCI, and the second field in the second signaling is a Counter DAI in the DCI.

In one embodiment, any of the K information blocks is carried by an RRC Information Element (IE).

In one embodiment, any of the K information blocks is an RRC signaling.

In one embodiment, any of the K information blocks is a higher-layer signaling.

In one embodiment, the K information blocks are respectively used to indicate K Control Resource Sets (CORESETs).

In one embodiment, the first resource set occupies a positive integer number of Resource Elements (REs).

In one embodiment, the first resource set comprises a CORESET.

In one embodiment, the first resource set is a CORESET.

In one embodiment, the second resource set occupies a positive integer number of REs.

In one embodiment, the second resource set comprises a CORESET.

In one embodiment, the second resource set is a CORESET.

In one embodiment, a physical layer channel for transmitting the first signaling comprises a Physical Downlink Control Channel (PDCCH).

In one embodiment, a physical layer channel for transmitting the second signaling comprises a PDCCH.

In one embodiment, the first signaling comprises a piece of Downlink Control Information (DCI).

In one embodiment, the second signaling comprises a piece of DCI.

In one embodiment, the first signaling and the second signaling are physical layer signalings, respectively.

In one embodiment, the first signaling and the second signaling are DCI, respectively.

In one embodiment, the first signaling is a piece of DCI used for downlink (DL) Grant.

In one embodiment, the second signaling is a piece of DCI used for DL Grant.

In one embodiment, the first signaling indicates activation of Semi-Persistent Scheduling (SPS), and the HARQ-ACK associated with the first signaling indicates whether the first signaling is correctly decoded.

In one embodiment, the first signaling indicates deactivation of SPS, and the HARQ-ACK associated with the first signaling indicates whether the first signaling is correctly decoded.

In one embodiment, the second signaling indicates activation of SPS, and the HARQ-ACK associated with the second signaling indicates whether the second signaling is correctly decoded.

In one embodiment, the second signaling indicates deactivation of SPS, and the HARQ-ACK associated with the second signaling indicates whether the second signaling is correctly decoded.

In one embodiment, the first-type index's name comprises r-16.

In one embodiment, the first-type index's name comprises r-17.

In one embodiment, the first-type index is a CORESETPoolIndex.

In one embodiment, the first-type index is used for identifying a control resource set pool.

In one embodiment, the first-type index is equal to 0 or 1.

In one embodiment, the first-type index is a non-negative integer.

In one embodiment, the first-type index is used for identifying a TRP.

In one embodiment, the second-type index is used for identifying a TCI-State.

In one embodiment, the second-type index comprises a TCI-StateId.

In one embodiment, the second-type index is a non-negative integer.

In one embodiment, the second-type index occupies more than one bit.

In one embodiment, the second-type index comprises a Physical Cell Identity (PCI).

In one embodiment, the second-type index comprises a ServCellIndex.

In one embodiment, the K information blocks comprise all IEs used for configuring CORESETs currently received by the first node.

In one embodiment, the first cell corresponds to a PCI.

In one embodiment, the first cell corresponds to a ServCellIndex.

In one embodiment, the first node transmits the first UCI on a Physical Uplink Control Channel (PUCCH) of the first cell.

In one embodiment, the first node transmits the first UCI on a Physical Uplink Shared Channel (PUSCH) of the first cell.

In one embodiment, the phrase of the first cell being capable of bearing a HARQ-ACK associated with the first signaling includes a meaning that the first cell schedules reception of a data channel of the first node via the first signaling, and the first node feeds back a HARQ-ACK of the data channel to the first cell.

In one embodiment, the phrase of the first cell being capable of bearing a HARQ-ACK associated with the first signaling includes a meaning that the first cell indicates activation of SPS via the first signaling, and the first node feeds back the HARQ-ACK for indicating whether the first signaling is correctly received to the first cell.

In one embodiment, the phrase of the first cell being capable of bearing a HARQ-ACK associated with the first signaling includes a meaning that the first cell indicates deactivation of SPS via the first signaling, and the first node feeds back the HARQ-ACK for indicating whether the first signaling is correctly received to the first cell.

In one embodiment, the first information block comprises Q1 second-type indexes, Q1 being a positive integer greater than 1.

In one subembodiment, Q1 is no greater than 8.
In one subembodiment, Q1 is no greater than 64.
In one subembodiment, Q1 is no greater than 128.
In one embodiment, the first information block only comprises a second-type index.

In one embodiment, any second-type index comprised in the first information block is used to indicate a TCI-State.

In one embodiment, any second-type index comprised in the first information block comprises a TCI-StateId.

In one embodiment, the second information block comprises Q2 second-type indexes, Q2 being a positive integer greater than 1.

In one subembodiment, Q2 is no greater than 8.
In one subembodiment, Q2 is no greater than 64.
In one subembodiment, Q2 is no greater than 128.
In one embodiment, the second information block only comprises a second-type index.

In one embodiment, any second-type index comprised in the second information block is used to indicate a TCI-State.

In one embodiment, any second-type index comprised in the second information block comprises a TCI-StateId.

In one embodiment, the reference signal resource indicated by the second-type index comprises at least one of a Channel State Information-Reference Signal (CSI-RS) resource or a Synchronization Signal/physical broadcast channel Block (SSB).

In one embodiment, the reference signal resource indicated by the second-type index comprises at least one of a CSI-RS or an SSB.

In one embodiment, the reference signal resource indicated by the second-type index is associated with at least one of a CSI-RS Resource Identity or an SSB Index.

In one embodiment, the reference signal resource indicated by the second-type index comprises a CSI-RS Resource Set Identity.

In one embodiment, the phrase that a Demodulation Reference Signal (DMRS) of a channel occupied by the first signaling and a first reference signal resource are quasi co-located (QCL) means that a Spatial Rx Parameter of the first reference signal resource is used for reception of a DMRS of the channel occupied by the first signaling.

In one embodiment, the phrase that a Demodulation Reference Signal (DMRS) of a channel occupied by the first signaling and a first reference signal resource are quasi co-located (QCL) means that a Spatial Rx Parameter of the first reference signal resource is used for reception of the first signaling.

In one embodiment, the phrase that a Demodulation Reference Signal (DMRS) of a channel occupied by the first signaling and a first reference signal resource are quasi co-located (QCL) means that the first node uses a same beam for receiving the first reference signal resource and the DMRS of the channel occupied by the first signaling.

In one embodiment, the phrase that a Demodulation Reference Signal (DMRS) of a channel occupied by the first signaling and a first reference signal resource are quasi co-located (QCL) means that the first reference signal resource is used for reception of the first signaling.

In one embodiment, the phrase that a DMRS of a channel occupied by the second signaling and a second reference signal resource are QCL means that a Spatial Rx Parameter of the second reference signal resource is used for reception of a DMRS of the channel occupied by the second signaling.

In one embodiment, the phrase that a DMRS of a channel occupied by the second signaling and a second reference signal resource are QCL means that a Spatial Rx Parameter of the second reference signal resource is used for reception of the second signaling.

In one embodiment, the phrase that a DMRS of a channel occupied by the second signaling and a second reference signal resource are QCL means that the first node uses a same beam for receiving the second reference signal resource and the DMRS of the channel occupied by the second signaling.

In one embodiment, the phrase that a DMRS of a channel occupied by the second signaling and a second reference signal resource are QCL means that the second reference signal resource is used for reception of the second signaling.

In one embodiment, the first reference signal resource comprises at least one of a CSI-RS resource or an SSB.

In one embodiment, the first reference signal resource comprises at least one of a CSI-RS or an SSB.

In one embodiment, the first reference signal resource is associated with at least one of a CSI-RS resource Identity or an SSB Index.

In one embodiment, the first reference signal resource comprises a CSI-RS resource set Identity.

In one embodiment, the second reference signal resource comprises at least one of a CSI-RS resource or an SSB.

In one embodiment, the second reference signal resource comprises at least one of a CSI-RS or an SSB.

In one embodiment, the second reference signal resource is associated with at least one of a CSI-RS resource Identity or an SSB Index.

In one embodiment, the second reference signal resource comprises a CSI-RS resource set Identity.

In one embodiment, the phrase that one said second-type index comprised in the first information block indicates the first reference signal resource means that the first information block comprises multiple TCI-States, and one of the multiple TCI-States indicates the first reference signal resource.

In one embodiment, the phrase that one said second-type index comprised in the second information block indicates the second reference signal resource means that the second information block comprises multiple TCI-States, and one of the multiple TCI-States indicates the second reference signal resource.

In one embodiment, the first UCI is transmitted on a physical layer channel.

In one embodiment, the first UCI is transmitted on a physical layer control channel.

In one embodiment, the first UCI is transmitted on a physical layer data channel.

In one embodiment, the first UCI is transmitted on a PUCCH.

In one embodiment, the first UCI is transmitted on a PUSCH.

In one embodiment, a PCI adopted by the target cell is different from a PCI adopted by the first candidate cell.

In one embodiment, the first candidate cell is a camped cell for the first node.

In one embodiment, the target cell is a neighbor cell of a camped cell for the first node.

In one embodiment, the phrase that the first reference signal resource is associated with a target cell means that the first reference signal resource is configured by the target cell.

In one embodiment, the phrase that the first reference signal resource is associated with a target cell means that the first reference signal resource is transmitted by the target cell.

In one embodiment, the phrase that the first reference signal resource is associated with a target cell means that the first reference signal resource is QCL with an SSB transmitted by the target cell.

In one embodiment, the phrase that the first reference signal resource is associated with a target cell means that configuration information of the first reference signal resource comprises a cell Identity (ID) of the target cell, the cell ID comprising a PCI, or the cell ID comprising a SeryCellIndex.

In one embodiment, the phrase that the first reference signal resource is associated with a target cell means that a cell ID of the target cell is used for generating a Reference Signal (RS) sequence in the first reference signal resource.

In one embodiment, the phrase that the second reference signal resource is associated with a first candidate cell means that the second reference signal resource is configured by the first candidate cell.

In one embodiment, the phrase that the second reference signal resource is associated with a first candidate cell means that the second reference signal resource is transmitted by the first candidate cell.

In one embodiment, the phrase that the second reference signal resource is associated with a first candidate cell means that the second reference signal resource is QCL with an SSB transmitted by the first candidate cell.

In one embodiment, the phrase that the second reference signal resource is associated with a first candidate cell means that configuration information of the second reference signal resource comprises a cell Identity (ID) of the first candidate cell, the cell ID comprising a PCI, or the cell ID comprising a ServCellIndex.

In one embodiment, the phrase that the second reference signal resource is associated with a first candidate cell means that a cell ID of the first candidate cell is used for generating an RS sequence in the second reference signal resource.

In one embodiment, the phrase of the first cell being capable of bearing a HARQ-ACK associated with the first signaling includes a meaning that information that can bear the HARQ-ACK associated with the first signaling can only be transmitted on the first cell.

In one subembodiment, the information bearing the HARQ-ACK associated with the first signaling comprises UCI.

In one embodiment, the phrase of the first cell being capable of bearing a HARQ-ACK associated with the first signaling includes a meaning that the HARQ-ACK associated with the first signaling can be transmitted on a PUCCH of the first cell or a PUSCH of another cell.

In one embodiment, the phrase of the first cell being capable of bearing a HARQ-ACK associated with the first signaling includes a meaning that the HARQ-ACK associated with the first signaling can be transmitted on a PUSCH of the first cell.

In one embodiment, the phrase of the first cell being capable of bearing a HARQ-ACK associated with the first signaling includes a meaning that the first signaling is a piece of DCI for scheduling a terminal in the target cell, and a PUCCH occupied by the HARQ-ACK associated with the first signaling can only be configured on the first cell.

In one embodiment, the phrase of the first cell being capable of bearing a HARQ-ACK associated with the first signaling includes a meaning that the first signaling is a piece of DCI for scheduling a terminal in the target cell, the target cell and the first cell belong to a first cell group simultaneously, and the first cell group at least comprises 2 cells, where the target cell is a Secondary Cell in the first cell group and the first cell is a Primary Cell in the first cell group.

In one embodiment, for a said resource set indicated by any of the K information blocks, a HARQ-ACK associated with a downlink signaling transmitted in the resource set can be configured to be transmitted on the first cell.

In one embodiment, for a said resource set indicated by any of the K information blocks, a PUCCH corresponding to a HARQ-ACK associated with a downlink signaling transmitted in the resource set can be configured on the first cell.

In one subembodiment of the above two embodiments, the above configuration is done by a MAC layer signaling.

In one embodiment, a reference time-domain resource of a HARQ-ACK associated with the first signaling and a reference time-domain resource of a HARQ-ACK associated with the second signaling are at least partially overlapping.

In one embodiment, a reference time-domain resource of a HARQ-ACK associated with the first signaling and a reference time-domain resource of a HARQ-ACK associated with the second signaling belong to a same slot.

In one subembodiment, the MAC layer delivers a Transport Block (TB) to a physical layer in each slot.

In one subembodiment, the slot lasts no longer than 1 ms.

In one subembodiment, the slot comprises 14 OFDM symbols.

In one embodiment, a reference time-domain resource of a HARQ-ACK associated with the first signaling and a reference time-domain resource of a HARQ-ACK associated with the second signaling belong to a same sub-slot.

In one subembodiment, the MAC layer delivers a Transport Block (TB) to a physical layer in each sub-slot.

In one subembodiment, a plurality of the sub-slots constitute a slot.

In one subembodiment, a number of Orthogonal Frequency Division Multiplexing (OFDM) symbols comprised in the sub-slot does not exceed 7.

In one embodiment, a given signaling indicates the reference time-domain resource of the HARQ-ACK associated with the given signaling, the given signaling being either the first signaling or the second signaling.

In one subembodiment, a PDSCH-to-HARQ feedback timing indicator field in the given signaling indicates the reference time-domain resource of the HARQ-ACK associated with the given signaling.

In one embodiment, a time interval between the reference time-domain resource of a HARQ-ACK associated with the given signaling and a time-domain resource occupied by the given signaling is indicated by a higher-layer signaling, the given signaling being either the first signaling or the second signaling.

In one subembodiment, the higher-layer signaling comprises a PUCCH-config IE.

In one subembodiment, the higher-layer signaling comprises a dl-DataToUL-ACK field.

In one subembodiment, the higher-layer signaling comprises a dl-DataToUL-ACK-r17 field.

In one subembodiment, the higher-layer signaling comprises a dl-DataToUL-ACK-DCI-1-2-r17 field.

In one subembodiment, the higher-layer signaling's name comprises dl-DataToUL-ACK.

In one embodiment, a Bandwidth Part (BWP) occupied by the first UCI is the same as a BWP for bearing the HARQ-ACK associated with the first signaling.

In one embodiment, the target cell belongs to a Secondary Cell Group (SCG).

In one embodiment, a cell for transmitting the K information blocks is different from the target cell.

In one embodiment, a cell for transmitting the K information blocks and the first cell belong to a same cell group.

In one embodiment, the first candidate cell and the first cell belong to a same cell group.

In one subembodiment of the above two embodiments, the same cell group is a Master Cell Group (MCG).

In one subembodiment of the above two embodiments, the same cell group is an SCG.

In one embodiment, the cell for transmitting the K information blocks belongs to an MCG, and the target cell belongs to an SCG.

In one embodiment, the cell for transmitting the K information blocks belongs to an SCG, and the target cell belongs to an MCG.

In one embodiment, each of the K information blocks comprises a ControlResourceSet IE in an RRC signaling.

In one embodiment, each of the K information blocks comprises a ControlResourceSet-r17 IE in an RRC signaling.

In one embodiment, each of the K information blocks comprises an IE in an RRC signaling, where the IE's name includes ControlResourceSet.

In one embodiment, each of the K information blocks comprises an RRC layer message.

In one embodiment, each of the K information blocks comprises a higher-layer signaling.

In one embodiment, the HARQ-ACK associates with a given signaling indicates whether a data channel scheduled by the given signaling is correctly received, the given signaling being either the first signaling or the second signaling.

In one embodiment, the HARQ-ACK associates with a given signaling indicates whether the given signaling is correctly received, the given signaling being either the first signaling or the second signaling.

In one embodiment, when a reference signal resource is transmitted by a cell, the reference signal resource is associated with the cell.

In one embodiment, when a reference signal resource is QCL with an SSB transmitted by a cell, the reference signal resource is associated with the cell.

In one embodiment, when configuration information of a reference signal resource comprises a cell ID of a cell, the reference signal resource is associated with the cell.

In one embodiment, when a cell ID of a cell is used for generating an RS sequence in a reference signal resource, the reference signal resource is associated with the cell.

In one embodiment, a type of the QCL in the present disclosure includes QCL Type D.

In one embodiment, a type of the QCL in the present disclosure includes QCL Type A.

In one embodiment, a type of the QCL in the present disclosure includes QCL Type B.

In one embodiment, a type of the QCL in the present disclosure includes QCL Type C.

In one embodiment, the cell ID in the present disclosure comprises a PCI of the cell.

In one embodiment, the cell ID in the present disclosure comprises a ServCellId of the cell.

Embodiment 2

Figure 2:
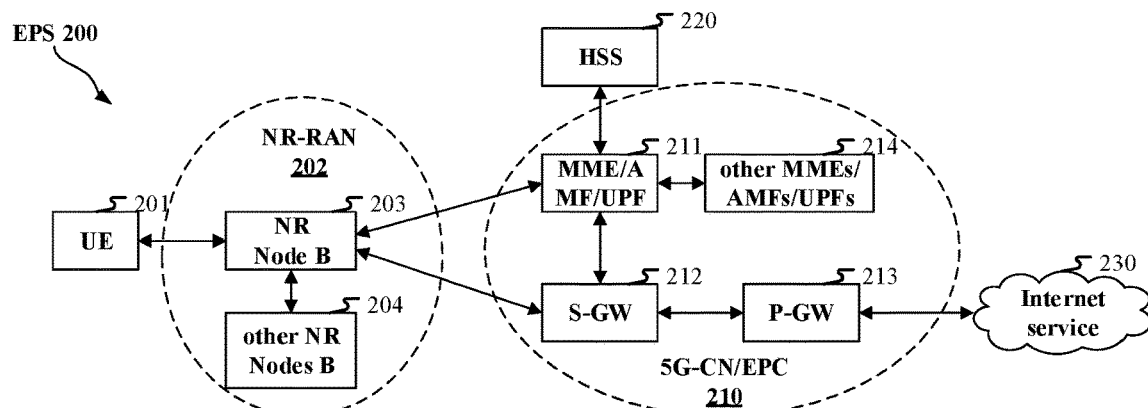
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called an Evolved Packet System (EPS) 200 or other suitable terminology. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, a vehicle terminal, V2X equipment or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present disclosure.

In one embodiment, the UE 201 is a terminal with the capability of triggering L1/L2 inter-cell handover.

In one embodiment, the UE 201 is a terminal with the capability of monitoring multiple beams.

In one embodiment, the UE 201 is a terminal supporting Massive-MIMO.

In one embodiment, the UE 201 is a terminal supporting Vehicle-to-Everything (V2X).

In one embodiment, the gNB203 corresponds to the second node in the present disclosure.

In one embodiment, the gNB203 supports the functionality of L1/L2 inter-cell handover.

In one embodiment, the gNB203 supports multi-beam transmission.

In one embodiment, the gNB203 supports transmissions based on Massive-MIMO.

Embodiment 3

Figure 3:
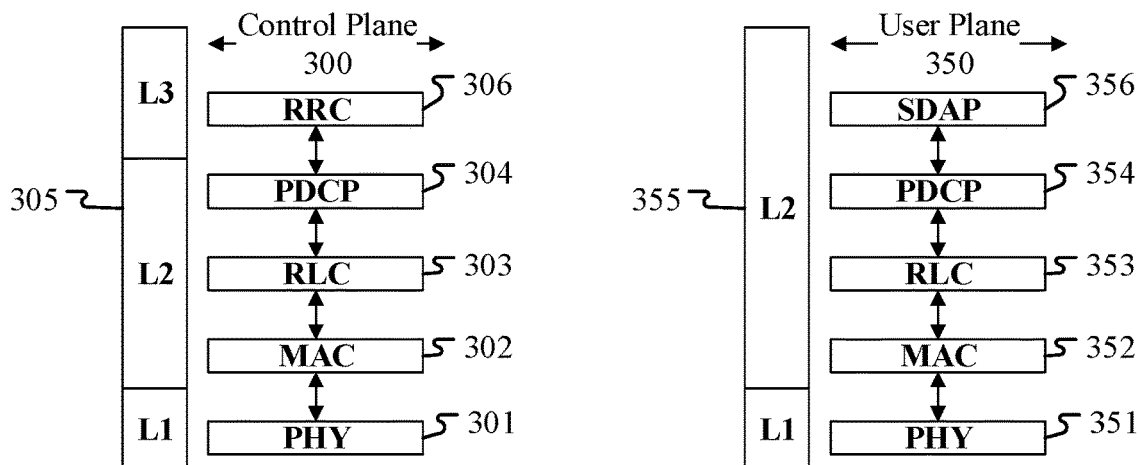
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or RSU in V2X) and a second communication node (gNB, UE, or RSU in V2X), or between two UEs, is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the first communication node and the second communication node or between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for handover of a first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer.

In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the PDCP304 of the second communication node is used for generating scheduling of the first communication node.

In one embodiment, the PDCP354 of the second communication node is used for generating scheduling of the first communication node.

In one embodiment, the K information blocks in the present disclosure are generated by the MAC302 or the MAC352.

In one embodiment, the K information blocks in the present disclosure are generated by the RRC306.

In one embodiment, the first signaling in the present disclosure is generated by the PHY301 or the PHY351.

In one embodiment, the first signaling in the present disclosure is generated by the MAC302 or the MAC352.

In one embodiment, the second signaling in the present disclosure is generated by the PHY301 or the PHY351.

In one embodiment, the second signaling in the present disclosure is generated by the MAC302 or the MAC352.

In one embodiment, the first UCI in the present disclosure is generated by the PHY301 or the PHY351.

In one embodiment, the first UCI in the present disclosure is generated by the MAC302 or the MAC352.

In one embodiment, the third information block in the present disclosure is generated by the MAC302 or the MAC352.

In one embodiment, the third information block in the present disclosure is generated by the PHY301 or the PHY351.

In one embodiment, the fourth information block in the present disclosure is generated by the MAC302 or the MAC352.

In one embodiment, the fourth information block in the present disclosure is generated by the PHY301 or the PHY351.

In one embodiment, the fifth information block in the present disclosure is generated by the MAC302 or the MAC352.

In one embodiment, the fifth information block in the present disclosure is generated by the PHY301 or the PHY351.

In one embodiment, the fifth information block in the present disclosure is generated by the RRC306.

In one embodiment, the first uplink information in the present disclosure is generated by the MAC302 or the MAC352.

In one embodiment, the first uplink information in the present disclosure is generated by the PHY301 or the PHY351.

In one embodiment, the second uplink information in the present disclosure is generated by the MAC302 or the MAC352.

In one embodiment, the second uplink information in the present disclosure is generated by the PHY301 or the PHY351.

In one embodiment, the first radio signal in the present disclosure is generated by the MAC302 or the MAC352.

In one embodiment, the first radio signal in the present disclosure is generated by the PHY301 or the PHY351.

In one embodiment, the second radio signal in the present disclosure is generated by the MAC302 or the MAC352.

In one embodiment, the second radio signal in the present disclosure is generated by the PHY301 or the PHY351.

In one embodiment, the target UCI in the present disclosure is generated by the PHY301 or the PHY351.

In one embodiment, the target UCI in the present disclosure is generated by the MAC302 or the MAC352.

In one embodiment, the first node is a terminal.

In one embodiment, the second node is a terminal.

In one embodiment, the second node is a Road Side Unit (RSU).

In one embodiment, the second node is a Grouphead.

In one embodiment, the second node is a Transmitter Receiver Point (TRP).

In one embodiment, the second node is a Cell.

In one embodiment, the second node is an eNB.

In one embodiment, the second node is a base station.

In one embodiment, the second node is used for management over multiple base stations.

In one embodiment, the second node is a node for management over multiple cells.

In one embodiment, the second node is a node for mobility management over multiple cells.

Embodiment 4

Figure 4:
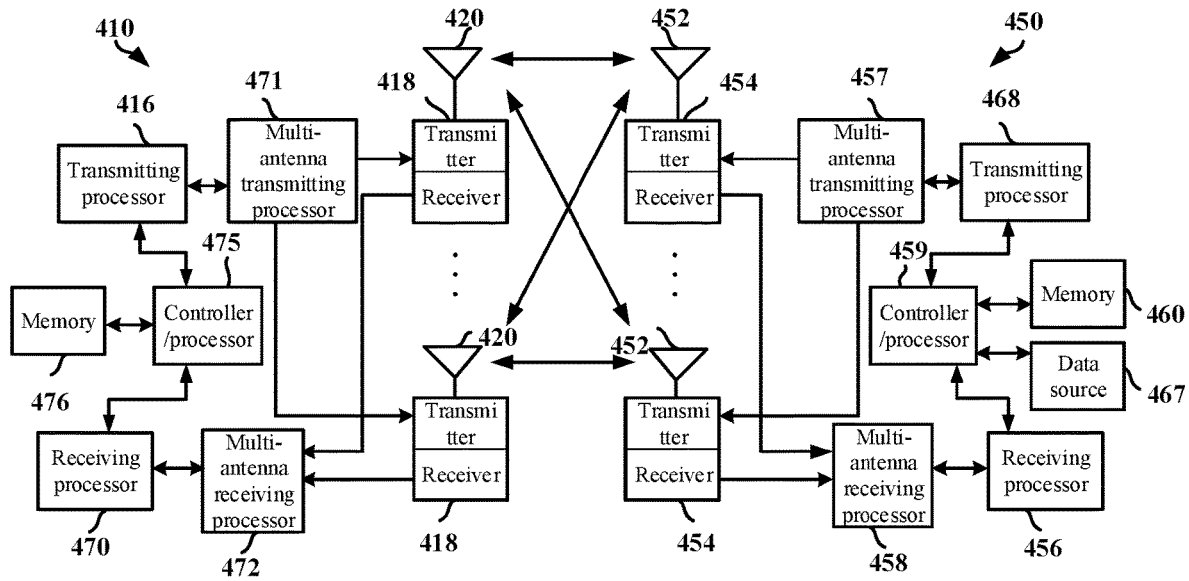
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 implements the functionality of the L2 layer. In the transmission from the second communication device 410 to the first communication device 450, the controller/processor 475 provides header compression, encryption, packet segmentation and reordering, multiplexing between a logical channel and a transport channel and radio resource allocation of the first communication device 450 based on various priorities. The controller/processor 475 is also in charge of a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping of signal clusters corresponding to each modulation scheme (i.e., BPSK, QPSK, M-PSK, and M-QAM, etc.). The multi-antenna transmitting processor 471 performs digital spatial precoding, including codebook-based precoding and non-codebook-based precoding, and beamforming processing on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to antennas 420.

In a transmission from the second communication device 410 to the first communication device 450, at the first communication device 450, each receiver 454 receives a signal via a corresponding antenna 452. Each receiver 454 recovers information modulated onto the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In the transmission from the second communication device 410 to the first communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including codebook-based precoding and non-codebook-based precoding, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor. The first communication device 450 at least receives K information blocks, K being a positive integer greater than 1, each of the K information blocks comprises a first-type index and at least one second-type index, and each of the K information blocks is used for indicating a resource set; and receives a first signaling and a second signaling respectively in a first resource set and a second resource set; the first resource set is the resource set indicated by a first information block, the first information block being one of the K information blocks, and the second resource set is the resource set indicated by a second information block, the second information block being one of the K information blocks other than the first information block; and transmits first UCI in a physical layer channel on a first cell, the first cell being capable of bearing a HARQ-ACK associated with the first signaling; the first-type index's name comprises CORESETPoolIndex; any said second-type index comprised in the K information blocks indicates a reference signal resource; a Demodulation Reference Signal (DMRS) of a channel occupied by the first signaling and a first reference signal resource are quasi co-located (QCL), and one said second-type index comprised in the first information block indicates the first reference signal resource; a DMRS of a channel occupied by the second signaling and a second reference signal resource are QCL, and one said second-type index comprised in the second information block indicates the second reference signal resource; the first reference signal resource is associated with a target cell, while the second reference signal resource is associated with a first candidate cell; the first UCI comprises a HARQ-ACK associated with a second signaling, the first-type index indicated by the first information block and the target cell are jointly used to determine whether the first UCI comprises the HARQ-ACK associated with the first signaling; the first signaling comprises a first field, and the second signaling comprises a second field; the second field in the second signaling is used to determine a number of HARQ-ACK bits that are comprised in the first UCI; whether the first field in the first signaling is used to determine the number of the HARQ-ACK bits that are comprised in the first UCI depends on the first-type index indicated by the first information block and the target cell.

In one embodiment, the first communication device 450 comprises a memory that stores a computer readable instruction program. The computer readable instruction program generates actions when executed by at least one processor. The actions include: receiving K information blocks, K being a positive integer greater than 1, each of the K information blocks comprises a first-type index and at least one second-type index, and each of the K information blocks is used for indicating a resource set; and receiving a first signaling and a second signaling respectively in a first resource set and a second resource set; the first resource set is the resource set indicated by a first information block, the first information block being one of the K information blocks, and the second resource set is the resource set indicated by a second information block, the second information block being one of the K information blocks other than the first information block; and transmitting first UCI in a physical layer channel on a first cell, the first cell being capable of bearing a HARQ-ACK associated with the first signaling; the first-type index's name comprises CORESET-PoolIndex; any said second-type index comprised in the K information blocks indicates a reference signal resource; a Demodulation Reference Signal (DMRS) of a channel occupied by the first signaling and a first reference signal resource are quasi co-located (QCL), and one said second-type index comprised in the first information block indicates the first reference signal resource; a DMRS of a channel occupied by the second signaling and a second reference signal resource are QCL, and one said second-type index comprised in the second information block indicates the second reference signal resource; the first reference signal resource is associated with a target cell, while the second reference signal resource is associated with a first candidate cell; the first UCI comprises a HARQ-ACK associated with a second signaling, the first-type index indicated by the first information block and the target cell are jointly used to determine whether the first UCI comprises the HARQ-ACK associated with the first signaling; the first signaling comprises a first field, and the second signaling comprises a second field; the second field in the second signaling is used to determine a number of HARQ-ACK bits that are comprised in the first UCI; whether the first field in the first signaling is used to determine the number of the HARQ-ACK bits that are comprised in the first UCI depends on the first-type index indicated by the first information block and the target cell.

In one embodiment, the second communication device 410 comprises at least one processor and at least one memory. The at least one memory comprises computer program codes. The at least one memory and the computer program codes are configured to be used in collaboration with the at least one processor. The second communication device 410 at least firstly transmits K information blocks, K being a positive integer greater than 1, each of the K information blocks comprises a first-type index and at least one second-type index, and each of the K information blocks is used for indicating a resource set; transmits a first signaling and a second signaling respectively in a first resource set and a second resource set; the first resource set is the resource set indicated by a first information block, the first information block being one of the K information blocks, and the second resource set is the resource set indicated by a second information block, the second information block being one of the K information blocks other than the first information block; and receives first UCI in a physical layer channel on a first cell, the first cell being capable of bearing a HARQ-ACK associated with the first signaling; the first-type index's name comprises CORESETPoolIndex; any said second-type index comprised in the K information blocks indicates a reference signal resource; a Demodulation Reference Signal (DMRS) of a channel occupied by the first signaling and a first reference signal resource are quasi co-located (QCL), and one said second-type index comprised in the first information block indicates the first reference signal resource; a DMRS of a channel occupied by the second signaling and a second reference signal resource are QCL, and one said second-type index comprised in the second information block indicates the second reference signal resource; the first reference signal resource is associated with a target cell, while the second reference signal resource is associated with a first candidate cell; the first UCI comprises a HARQ-ACK associated with a second signaling, the first-type index indicated by the first information block and the target cell are jointly used to determine whether the first UCI comprises the HARQ-ACK associated with the first signaling; the first signaling comprises a first field, and the second signaling comprises a second field; the second field in the second signaling is used to determine a number of HARQ-ACK bits that are comprised in the first UCI; whether the first field in the first signaling is used to determine the number of the HARQ-ACK bits that are comprised in the first UCI depends on the first-type index indicated by the first information block and the target cell.

In one embodiment, the second communication device 410 comprises a memory that stores a computer readable instruction program. The computer readable instruction program generates actions when executed by at least one processor. The actions include: transmitting K information blocks, K being a positive integer greater than 1, each of the K information blocks comprises a first-type index and at least one second-type index, and each of the K information blocks is used for indicating a resource set; transmitting a first signaling and a second signaling respectively in a first resource set and a second resource set; the first resource set is the resource set indicated by a first information block, the first information block being one of the K information blocks, and the second resource set is the resource set indicated by a second information block, the second information block being one of the K information blocks other than the first information block; and receiving first UCI in a physical layer channel on a first cell, the first cell being capable of bearing a HARQ-ACK associated with the first signaling; the first-type index's name comprises CORESETPoolIndex; any said second-type index comprised in the K information blocks indicates a reference signal resource; a Demodulation Reference Signal (DMRS) of a channel occupied by the first signaling and a first reference signal resource are quasi co-located (QCL), and one said second-type index comprised in the first information block indicates the first reference signal resource; a DMRS of a channel occupied by the second signaling and a second reference signal resource are QCL, and one said second-type index comprised in the second information block indicates the second reference signal resource; the first reference signal resource is associated with a target cell, while the second reference signal resource is associated with a first candidate cell; the first UCI comprises a HARQ-ACK associated with a second signaling, the first-type index indicated by the first information block and the target cell are jointly used to determine whether the first UCI comprises the HARQ-ACK associated with the first signaling; the first signaling comprises a first field, and the second signaling comprises a second field; the second field in the second signaling is used to determine a number of HARQ-ACK bits that are comprised in the first UCI; whether the first field in the first signaling is used to determine the number of the HARQ-ACK bits that are comprised in the first UCI depends on the first-type index indicated by the first information block and the target cell.

In one embodiment, the first communication device 450 corresponds to the first node in the present disclosure.

In one embodiment, the second communication device 410 corresponds to the second node in the present disclosure.

In one embodiment, the first communication device 450 is a UE.

In one embodiment, the first communication device 450 is a terminal.

In one embodiment, the second communication device 410 is a base station.

In one embodiment, the second communication device 410 is a UE.

In one embodiment, the second communication device 410 is network equipment.

In one embodiment, the second communication device 410 is a serving cell.

In one embodiment, the second communication device 410 is a TRP.

In one embodiment, at least the first four of the antenna 452, the receiver 454, the multi-antenna receiving processor 458, the receiving processor 456, and the controller/processor 459 are used for receiving K information blocks; at least the first four of the antenna 420, the transmitter 418, the multi-antenna transmitting processor 471, the transmitting processor 416 and the controller/processor 475 are used for transmitting K information blocks.

In one embodiment, at least the first four of the antenna 452, the receiver 454, the multi-antenna receiving processor 458, the receiving processor 456, and the controller/processor 459 are used for receiving a first signaling and a second signaling respectively in a first resource set and a second resource set; at least the first four of the antenna 420, the transmitter 418, the multi-antenna transmitting processor 471, the transmitting processor 416 and the controller/processor 475 are used for transmitting a first signaling and a second signaling respectively in a first resource set and a second resource set.

In one embodiment, at least the first four of the antenna 452, the transmitter 454, the multi-antenna transmitting processor 457, the transmitting processor 468, and the controller/processor 459 are used for transmitting first UCI in a physical layer channel on a first cell; at least the first four of the antenna 420, the receiver 418, the multi-antenna receiving processor 472, the receiving processor 470 and the controller/processor 475 are used for receiving first UCI in a physical layer channel on a first cell.

In one embodiment, at least the first four of the antenna 452, the receiver 454, the multi-antenna receiving processor 458, the receiving processor 456, and the controller/processor 459 are used for receiving a third information block; at least the first four of the antenna 420, the transmitter 418, the multi-antenna transmitting processor 471, the transmitting processor 416 and the controller/processor 475 are used for transmitting a third information block.

In one embodiment, at least the first four of the antenna 452, the transmitter 454, the multi-antenna transmitting processor 457, the transmitting processor 468, and the controller/processor 459 are used for transmitting a first uplink information block; at least the first four of the antenna 420, the receiver 418, the multi-antenna receiving processor 472, the receiving processor 470 and the controller/processor 475 are used for receiving a first uplink information block.

In one embodiment, at least the first four of the antenna 452, the receiver 454, the multi-antenna receiving processor 458, the receiving processor 456, and the controller/processor 459 are used for receiving a fourth information block; at least the first four of the antenna 420, the transmitter 418, the multi-antenna transmitting processor 471, the transmitting processor 416 and the controller/processor 475 are used for transmitting a fourth information block.

In one embodiment, at least the first four of the antenna 452, the transmitter 454, the multi-antenna transmitting processor 457, the transmitting processor 468, and the controller/processor 459 are used for transmitting a second uplink information block; at least the first four of the antenna 420, the receiver 418, the multi-antenna receiving processor 472, the receiving processor 470 and the controller/processor 475 are used for receiving a second uplink information block.

In one embodiment, at least the first four of the antenna 452, the receiver 454, the multi-antenna receiving processor 458, the receiving processor 456, and the controller/processor 459 are used for receiving a first radio signal; at least the first four of the antenna 420, the transmitter 418, the multi-antenna transmitting processor 471, the transmitting processor 416 and the controller/processor 475 are used for transmitting a first radio signal.

In one embodiment, at least the first four of the antenna 452, the receiver 454, the multi-antenna receiving processor 458, the receiving processor 456, and the controller/processor 459 are used for receiving a second radio signal; at least the first four of the antenna 420, the transmitter 418, the multi-antenna transmitting processor 471, the transmitting processor 416 and the controller/processor 475 are used for transmitting a second radio signal.

In one embodiment, at least the first four of the antenna 452, the receiver 454, the multi-antenna receiving processor 458, the receiving processor 456, and the controller/processor 459 are used for receiving a fifth information block; at least the first four of the antenna 420, the transmitter 418, the multi-antenna transmitting processor 471, the transmitting processor 416 and the controller/processor 475 are used for transmitting a fifth information block.

at least the first four of the antenna 452, the transmitter 454, the multi-antenna transmitting processor 457, the transmitting processor 468, and the controller/processor 459 are used for transmitting target UCI in a target time-domain resource set; at least the first four of the antenna 420, the receiver 418, the multi-antenna receiving processor 472, the receiving processor 470 and the controller/processor 475 are used for receiving target UCI in a target time-domain resource set.

Embodiment 5

Figure 5:
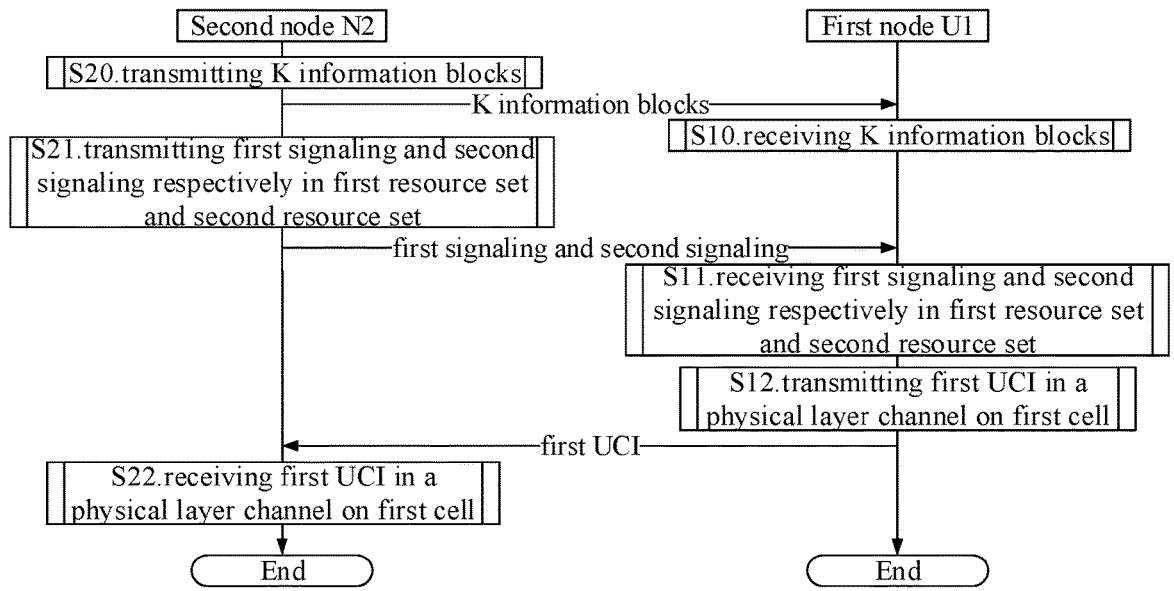
FIG. 5 illustrates a flowchart of first UCI according to one embodiment of the present disclosure.

Embodiment 5 illustrates a flowchart of first UCI, as shown in FIG. 5. In FIG. 5, a first node U1 and a second node N2 are in communications via a radio link. It should be particularly noted that the sequence illustrated in this figure does not set any limit on the order of signal transmissions and implementations in the present disclosure.

The first node U1 receives K information blocks in step S10; receives a first signaling and a second signaling respectively in a first resource set and a second resource set in step S11; and transmits first UCI in a physical layer channel on a first cell in step S12.

The second node N2 transmits K information blocks in step S20; transmits a first signaling and a second signaling respectively in a first resource set and a second resource set in step S21; and receives first UCI in a physical layer channel on a first cell in step S22.

In Embodiment 5, K is a positive integer greater than 1, each of the K information blocks comprises a first-type index and at least one second-type index, and each of the K information blocks is used for indicating a resource set; the first resource set is the resource set indicated by a first information block, the first information block being one of the K information blocks, and the second resource set is the resource set indicated by a second information block, the second information block being one of the K information blocks other than the first information block; the first cell is capable of bearing a HARQ-ACK associated with the first signaling; the first-type index's name comprises CORESET-PoolIndex; any said second-type index comprised in the K information blocks indicates a reference signal resource; a Demodulation Reference Signal (DMRS) of a channel occupied by the first signaling and a first reference signal resource are quasi co-located (QCL), and one said second-type index comprised in the first information block indicates the first reference signal resource; a DMRS of a channel occupied by the second signaling and a second reference signal resource are QCL, and one said second-type index comprised in the second information block indicates the second reference signal resource; the first reference signal resource is associated with a target cell, while the second reference signal resource is associated with a first candidate cell; the first UCI comprises a HARQ-ACK associated with a second signaling, the first-type index indicated by the first information block and the target cell are jointly used to determine whether the first UCI comprises the HARQ-ACK associated with the first signaling; the first signaling comprises a first field, and the second signaling comprises a second field; the second field in the second signaling is used to determine a number of HARQ-ACK bits that are comprised in the first UCI; whether the first field in the first signaling is used to determine the number of the HARQ-ACK bits that are comprised in the first UCI depends on the first-type index indicated by the first information block and the target cell.

In one embodiment, a time-domain resource occupied by the first UCI is a reference time-domain resource of a HARQ-ACK associated with the second signaling.

In one subembodiment, the first UCI comprises HARQ-ACKs associated with Q3 downlink signalings, Q3 being a positive integer greater than 1 and no greater than 14, the second signaling being one of the Q3 downlink signalings; reference time-domain resources of the HARQ-ACKs associated with the Q3 downlink signalings respectively occupy Q3 time slices, and the Q3 time slices belong to a same slot; the reference time-domain resource of the HARQ-ACK associated with the second signaling is a latest one of the Q3 time slices.

In one subsidiary embodiment of the subembodiment, any of the Q3 time slices comprises at least one OFDM symbol.

In one subsidiary embodiment of the subembodiment, the Q3 time slices are Q3 sub-slots, respectively.

In one subsidiary embodiment of the subembodiment, the Q3 time slices belong to a same slot.

In one subembodiment, the first signaling is used to indicate the reference time-domain resource of the HARQ-ACK associated with the second signaling.

In one subembodiment, an RRC signaling is used to indicate the reference time-domain resource of the HARQ-ACK associated with the second signaling.

In one subembodiment, a time-domain resource occupied by the second radio signal is used to determine the reference time-domain resource of the HARQ-ACK associated with the second signaling.

In one embodiment, a time-domain resource occupied by the first UCI is simultaneously associated with a reference time-domain resource of the HARQ-ACK associated with the first signaling and a reference time-domain resource of the HARQ-ACK associated with the second signaling.

In one embodiment, the first signaling is used to indicate a first time-domain resource set, and the second signaling is used to indicate a second time-domain resource set, the first time-domain resource set is used for feeding back a HARQ-ACK of the first signaling, and the second time-domain resource set is used for feeding back a HARQ-ACK of the second signaling, the first time-domain resource and the second time-domain resource are overlapping, and the first UCI is transmitted in either of the first time-domain resource set and the second time-domain resource set.

In one embodiment, the first candidate cell and the first cell belong to an MCG.

In one embodiment, the first candidate cell and the first cell are a same cell.

In one embodiment, the first-type index comprised in the first information block is the same as the first-type index comprised in the second information block; all conditions in a first condition set being fulfilled is used to determine that the first field in the first signaling is not used to determine the number of the HARQ-ACK bits comprised in the first UCI; the first condition set comprises: the first candidate cell is different from the target cell.

In one subembodiment, the first condition set comprises: the first candidate cell and the target cell belong to different cell groups.

In one subembodiment, the phrase that the first candidate cell is different from the target cell means that the first candidate cell and the target cell respectively adopt different PCIs.

In one subembodiment, the phrase that the first candidate cell is different from the target cell means that the first candidate cell and the target cell respectively adopt different ServCellIndexes.

In one subembodiment, the first condition set comprises: there aren't two information blocks among the K information blocks that respectively comprise two second-type indexes indicating a same reference signal resource associated with the target cell, with the first-type indexes respectively comprised in the two information blocks being different.

In one subsidiary embodiment of the subembodiment, a given first information block and a given second information block are any two information blocks of the K information blocks that comprise different first-type indexes, the given first information block comprises Q3 second-type indexes, and the given second information block comprises Q4 second-type indexes, where both Q3 and Q4 are positive integers, among the Q3 second-type indexes and the Q4 second-type indexes there aren't two second-type indexes respectively belonging to the given first information block and the given second information block that are associated with a same reference signal resource of the target cell.

In one embodiment, the first-type index comprised in the first information block is the same as the first-type index comprised in the second information block; all conditions in a first condition set being fulfilled is used to determine that the first field in the first signaling is not used to determine the number of the HARQ-ACK bits comprised in the first UCI; the first condition set comprises: the first candidate cell is different from the target cell; and HARQ-ACKs associated with all downlink physical layer signalings of the target cell are not fed back respectively.

In one subembodiment, the target cell is only configured with a CORESET Pool.

In one subembodiment, the target cell is not configured with a CORESET Pool.

In one subembodiment, the phrase that HARQ-ACKs associated with all downlink physical layer signalings of the target cell are not fed back respectively means: HARQ-ACKs associated with all downlink physical layer signalings of the target cell can be fed back in a same HARQ codebook.

In one subsidiary embodiment of the subembodiment, reference time-domain resources of the HARQ-ACKs belong to a same slot.

In one subsidiary embodiment of the subembodiment, reference time-domain resources of the HARQ-ACKs belong to a same sub-slot.

In one embodiment, an offset between reception of the first signaling and the first radio signal is smaller than a first offset value; a DMRS comprised by the first radio signal and a DMRS comprised by a control resource set with a minimum control resource set index in a first target control resource set pool are QCL; the first target control resource set pool comprises a control resource set indicated by any information block in a first information block subset; the first information block subset comprises a first target information block, and the first target information block is any one of information blocks that fulfill a first target condition set among the K information blocks; the first target condition set comprises that a first-type index comprised in the first target information block is the same as the first-type index comprised in the first information block; and the first target condition set comprises that the first target information block comprises at least one second-type index, and a reference signal resource indicated by the second-type index comprised in the first target information block is associated with the target cell.

In one subembodiment, the first target condition set also comprises: a reference signal resource being activated for PDCCH reception is associated with the target cell, and the reference signal resource activated for PDCCH reception is indicated by the second-type index comprised in the first target information block.

In one subembodiment, a CORESETPoolIndex adopted by the first target control resource set pool is equal to 0.

In one subembodiment, the first target control resource set pool is not configured with a CORESETPoolIndex.

In one subembodiment, all CORESETs configured for the target cell belong to the first target control resource set pool.

In one subembodiment, the first condition set comprises the first target condition set.

In one embodiment, the first-type index comprised in the first information block is different from the first-type index comprised in the second information block; all conditions in a second condition set being fulfilled is used to determine that the first field in the first signaling is used to determine the number of the HARQ-ACK bits comprised in the first UCI; the second condition set comprises: the first candidate cell is the same as the target cell.

In one subembodiment, the second condition set comprises: the first candidate cell and the first cell belong to different cell groups.

In one subembodiment, the second condition set comprises: the first candidate cell and the first cell belong to an SCG and an MCG, respectively.

In one subembodiment, the second condition set comprises: there are two information blocks among the K information blocks that respectively comprise two second-type indexes indicating a same reference signal resource associated with the target cell, with the first-type indexes respectively comprised in the two information blocks being different.

In one subsidiary embodiment of the subembodiment, a target first information block and a target second information block are any two information blocks of the K information blocks that comprise different first-type indexes, the target first information block comprises Q5 second-type indexes, and the target second information block comprises Q6 second-type indexes, where both Q5 and Q6 are positive integers, among the Q5 second-type indexes and the Q6 second-type indexes there are two second-type indexes respectively being associated with a same reference signal resource of the target cell.

In one embodiment, an offset between reception of the first signaling and the first radio signal is smaller than a first offset value; a DMRS comprised by the first radio signal and a DMRS comprised by a control resource set with a minimum control resource set index in a second target control resource set pool are QCL; the second target control resource set pool comprises a control resource set indicated by any information block in a second information block subset; the second information block subset comprises a second target information block, and the second target information block is any one of information blocks that fulfill a second target condition set among the K information blocks; the second target condition set comprises that the second target information block comprises at least one second-type index, and a reference signal resource indicated by the second-type index comprised in the second target information block is associated with the target cell.

In one subembodiment, the second target condition set also comprises: a reference signal resource being activated for PDCCH reception is associated with the target cell, and the reference signal resource activated for PDCCH reception is indicated by the second-type index comprised in the second target information block.

In one subembodiment, a CORESETPoolIndex adopted by the second target control resource set pool is equal to 0.

In one subembodiment, the second target control resource set pool is not configured with a CORESETPoolIndex.

In one subembodiment, all CORESETs configured for the target cell belong to the second target control resource set pool.

In one subembodiment, the second condition set comprises the second target condition set.

Embodiment 6

Figure 6:
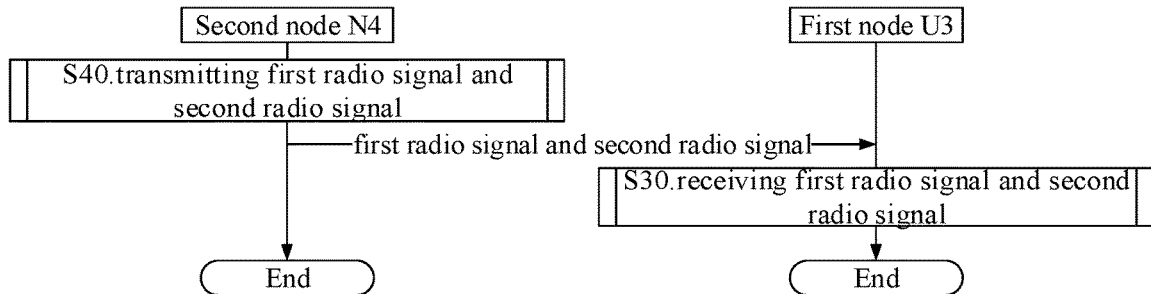
FIG. 6 illustrates a flowchart of a first radio signal and a second radio signal according to one embodiment of the present disclosure.

Embodiment 6 illustrates a flowchart of a first radio signal and a second radio signal, as shown in FIG. 6. In FIG. 6, a first node U3 and a second node N4 are in communication via a radio link. It should be particularly noted that the sequence illustrated in this figure does not set any limit on the order of signal transmissions and implementations in the present disclosure.

The first node U3 receives a first radio signal and a second radio signal in step S30.

The second node N4 transmits a first radio signal and a second radio signal in step S40.

In Embodiment 6, the first signaling comprises configuration information of the first radio signal, and the HARQ-ACK associated with the first signaling indicates whether a bit block carried by the first radio signal is correctly decoded; the second signaling comprises configuration information of the second radio signal, and the HARQ-ACK associated with the second signaling indicates whether a bit block carried by the second radio signal is correctly decoded.

In one embodiment, the step S30 is taken after the step S11 and before the step S12 of the Embodiment 5.

In one embodiment, the step S40 is taken after the step S21 and before the step S22 of the Embodiment 5.

In one embodiment, the first radio signal is transmitted on a Physical Downlink Shared Channel (PDSCH).

In one embodiment, the first radio signal is a PDSCH.

In one embodiment, the bit block comprises at least one Transport Block (TB).

In one embodiment, the bit block comprises at least one Code Block Group (CBG).

In one embodiment, the first signaling is a Downlink (DL) Grant, and the first signaling is used to schedule the first radio signal.

In one embodiment, configuration information of the first radio signal comprises frequency-domain resources occupied by the first radio signal.

In one embodiment, configuration information of the first radio signal comprises time-domain resources occupied by the first radio signal.

In one embodiment, configuration information of the first radio signal comprises a HARQ Process Number employed by the first radio signal.

In one embodiment, configuration information of the first radio signal comprises a Modulation and Coding Scheme (MCS) employed by the first radio signal.

In one embodiment, configuration information of the first radio signal comprises a Redundancy Version (RV) employed by the first radio signal.

In one embodiment, the second radio signal is transmitted on a PDSCH.

In one embodiment, the second radio signal is a PDSCH.

In one embodiment, the bit block comprises at least one TB.

In one embodiment, the bit block comprises at least one CBG.

In one embodiment, the second signaling is a DL Grant, and the second signaling is used to schedule the second radio signal.

In one embodiment, configuration information of the second radio signal comprises frequency-domain resources occupied by the second radio signal.

In one embodiment, configuration information of the second radio signal comprises time-domain resources occupied by the second radio signal.

In one embodiment, configuration information of the second radio signal comprises a HARQ Process Number employed by the second radio signal.

In one embodiment, configuration information of the second radio signal comprises an MCS employed by the second radio signal.

In one embodiment, configuration information of the second radio signal comprises an RV employed by the second radio signal.

Embodiment 7

Figure 7:
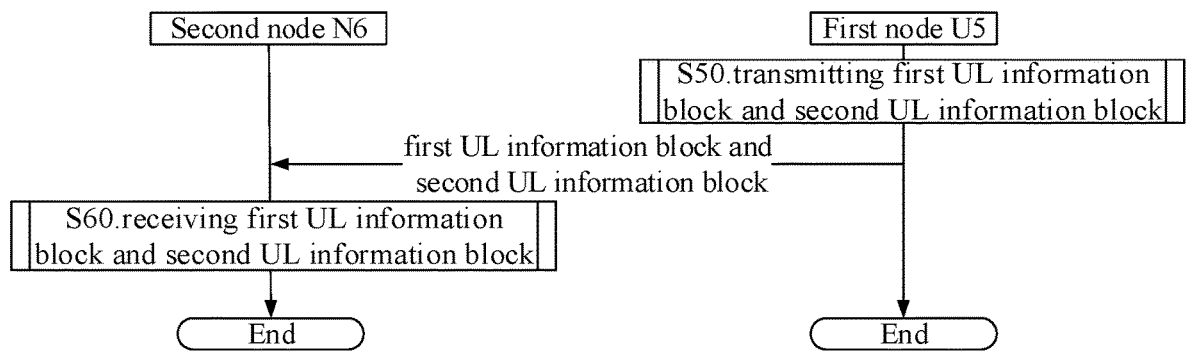
FIG. 7 illustrates a flowchart of a first uplink (UL) information block and a second UL information block according to one embodiment of the present disclosure.

Embodiment 7 illustrates a flowchart of a first uplink (UL) information block and a second UL information block, as shown in FIG. 7. In FIG. 7, a first node U5 and a second node N6 are in communication via a radio link. It should be particularly noted that the sequence illustrated in this figure does not set any limit on the order of signal transmissions and implementations in the present disclosure.

The first node U5 transmits a first uplink information block and a second uplink information block in step S50.

The second node N6 receives a first uplink information block and a second uplink information block in step S60.

In Embodiment 7, the first uplink information block is used to indicate a said second-type index comprised in the first information block, and the second uplink information block is used to indicate a said second-type index comprised in the second information block.

In one embodiment, the step S50 is taken after the step S10 and before the step S11 in Embodiment 5.

In one embodiment, the step S60 is taken after the step S20 and before the step S21 in Embodiment 5.

In one embodiment, a physical layer channel bearing the first UL information block comprises a PUCCH.

In one embodiment, a physical layer channel bearing the first UL information block comprises a Physical Random Access Channel (PRACH).

In one embodiment, Beam Failure Recovery (BFR) is included for bearing the first UL information block.

In one embodiment, the first UL information block is used for reporting beam failure.

In one embodiment, the first UL information block is used for reporting a new candidate beam.

In one embodiment, the first UL information block is used for indicating a given second-type index, and the given second-type index is used for indicating the first reference signal resource.

In one embodiment, a physical layer channel bearing the second UL information block comprises a PUCCH.

In one embodiment, a physical layer channel bearing the second UL information block comprises a PRACH.

In one embodiment, BFR is included for bearing the second UL information block.

In one embodiment, the second UL information block is used for reporting beam failure.

In one embodiment, the second UL information block is used for reporting a new candidate beam.

In one embodiment, the second UL information block is used for indicating a given second-type index, and the given second-type index is used for indicating the first reference signal resource.

Embodiment 8

Figure 8:
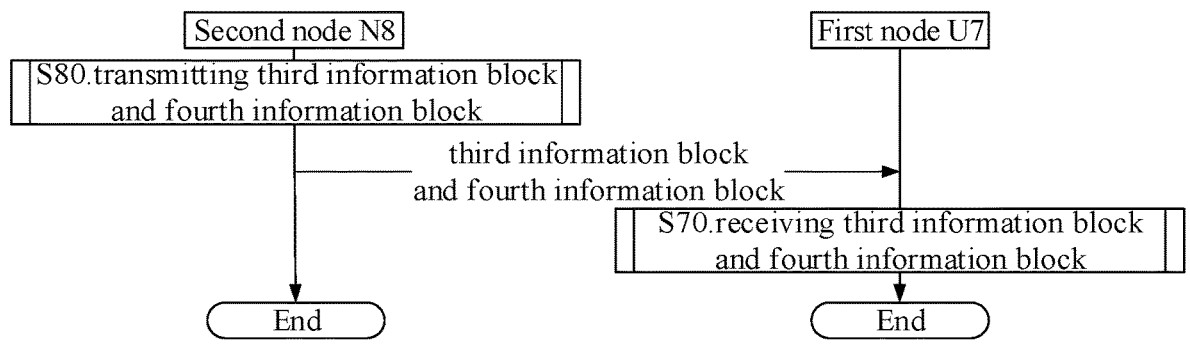
FIG. 8 illustrates a flowchart of a third information block and a fourth information block according to one embodiment of the present disclosure.

Embodiment 8 illustrates a flowchart of a third information block and a fourth information block, as shown in FIG. 8. In FIG. 8, a first node U7 and a second node N8 are in communication via a radio link. It should be particularly noted that the sequence illustrated in this figure does not set any limit on the order of signal transmissions and implementations in the present disclosure.

The first node U7 receives a third information block and a fourth information block in step S70.

The second node N8 transmits a third information block and a fourth information block in step S80.

In Embodiment 8, the third information block is used to indicate a said second-type index comprised in the first information block, and the fourth information block is used to indicate a said second-type index comprised in the second information block.

In one embodiment, the step S70 is taken after the step S10 and before the step S11 in Embodiment 5.

In one embodiment, the step S80 is taken after the step S20 and before the step S21 in Embodiment 5.

In one embodiment, the third information block is carried by a MAC Control Element (CE).

In one embodiment, the third information block is TCI State Indication for UE-specific PDCCH MAC CE.

In one embodiment, the first information block comprises Q1 second-type indexes, and the third information block is used to indicate a given second-type index from the Q1 second-type indexes, the given second-type index being used to indicate the first reference signal resource.

In one embodiment, the fourth information is carried by a MAC CE.

In one embodiment, the fourth information block is TCI State Indication for UE-specific PDCCH MAC CE.

In one embodiment, the second information block comprises Q2 second-type indexes, and the fourth information block is used to indicate a target second-type index from the Q2 second-type indexes, the target second-type index being used to indicate the second reference signal resource.

Embodiment 9

Figure 9:
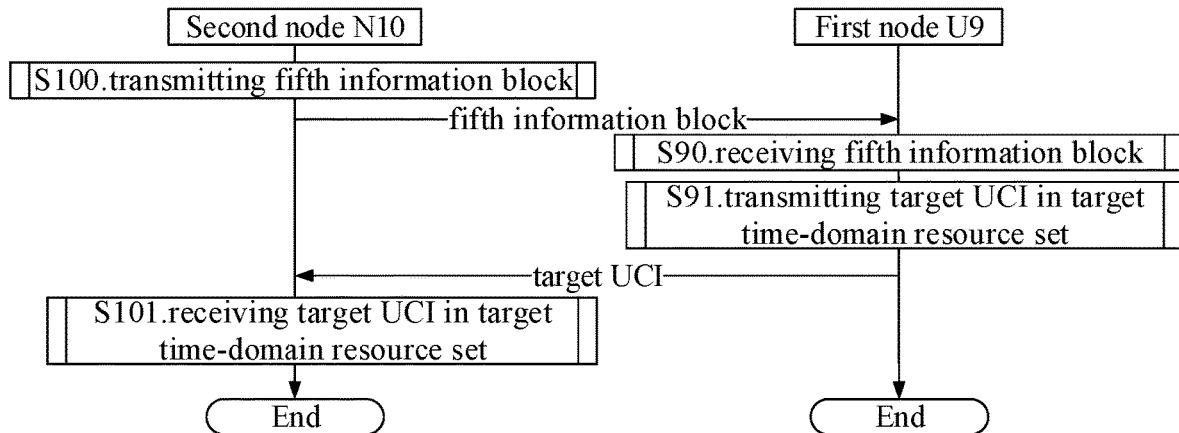
FIG. 9 illustrates a flowchart of a fifth information block according to one embodiment of the present disclosure.

Embodiment 9 illustrates a flowchart of a fifth information block, as shown in FIG. 9. In FIG. 9, a first node U9 and a second node N10 are in communication via a radio link. It should be particularly noted that the sequence illustrated in this figure does not set any limit on the order of signal transmissions and implementations in the present disclosure.

The first node U9 receives a fifth information block in step S90, and transmits target UCI in a target time-domain resource set in step S91.

The second node N10 transmits a fifth information block in step S100, and receives target UCI in a target time-domain resource set in step S101.

In Embodiment 9, the first UCI does not comprise a HARQ-ACK associated with the first signaling, the fifth information block is used to determine a position of a time-domain resources occupied by the target time-domain resource set, and the target UCI comprises the HARQ-ACK associated with the first signaling; time-domain resources occupied by the target time-domain resource set and a time-domain resource occupied by the first UCI are orthogonal.

In one embodiment, the step S90 is after the step S10 in Embodiment 5 of the present disclosure, and is before the step S11 in Embodiment 5 of the present disclosure.

In one embodiment, the step S91 is after the step S12 in Embodiment 5 of the present disclosure.

In one embodiment, the step S100 is after the step S20 in Embodiment 5 of the present disclosure, and is before the step S21 in Embodiment 5 of the present disclosure.

In one embodiment, the step S101 is after the step S22 in Embodiment 5 of the present disclosure.

In one embodiment, the fifth information block is carried by an RRC signaling.

In one embodiment, the fifth information block is used to indicate a position of time-domain resources occupied by the target time-domain resource set.

In one embodiment, the fifth information block is used to indicate a second offset value, a time-domain resource occupied by the first UCI together with the second offset value is used to determine a position of time-domain resources occupied by the target time-domain resource set.

In one embodiment, a third signaling comprises the fifth information block, the fifth information block being one of the K information blocks, the fifth information block is used to indicate a third resource set, and one said second-type index comprised in the fifth information block indicates the third reference signal resource; the third reference signal resource is associated with a second candidate cell; the third signaling is transmitted in the third resource set, and the third signaling is a first physical layer control signaling that fulfills a third condition after the first signaling.

In one subembodiment, the third condition comprises: the first-type index comprised in the fifth information block is different from the first-type index comprised in the first information block, and the first candidate cell is the same as the target cell.

In one subembodiment, the third condition comprises: the first-type index comprised in the fifth information block is the same as the first-type index comprised in the first information block, and the first candidate cell is the same as the target cell.

In one subembodiment, the third signaling is a piece of DCI.

In one subembodiment, the third signaling is a DL scheduling.

In one subembodiment, the third signaling is a UL scheduling.

In one embodiment, the target UCI is transmitted on a physical layer channel.

In one embodiment, the target UCI is transmitted on a physical layer control channel.

In one embodiment, the target UCI is transmitted on a physical layer data channel.

In one embodiment, the target UCI is transmitted on a PUCCH.

In one embodiment, the target UCI is transmitted on a PUSCH.

Embodiment 10

Figure 10:
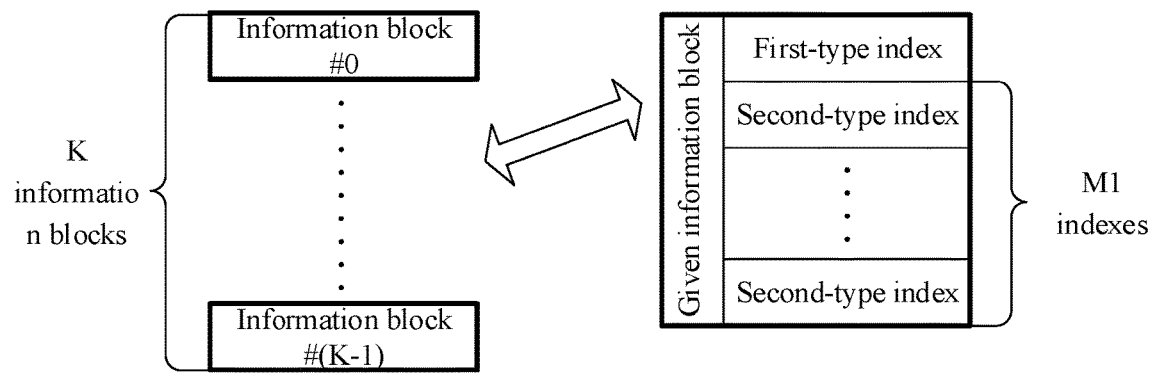
FIG. 10 illustrates a schematic diagram of K information blocks according to one embodiment of the present disclosure.

Embodiment 10 illustrates a schematic diagram of K information blocks, as shown in FIG. 10. FIG. 10, a given information block is an information block of K information blocks illustrated herein, and the given information block comprises one first-type index and M1 second-type indexes, M1 being a positive integer greater than 1. The K information blocks respectively correspond to information block #0 through information block #(K−1) illustrated herein.

In one embodiment, the given information block comprises a ControlResouceSet IE in TS 38.331.

In one embodiment, the given information block is used for configuring a CORESET.

In one embodiment, a CORESET indicated by the given information block is configured by the target cell and the first candidate cell simultaneously.

In one embodiment, both the target cell and the first candidate cell can transmit a PDCCH in a CORESET indicated by the given information block.

In one embodiment, the given information block is any information block of the K information blocks.

In one embodiment, the given information block is the first information block, and a CORESET indicated by the given information block is the first resource set.

In one embodiment, the given information block is the second information block, and a CORESET indicated by the given information block is the second resource set.

In one embodiment, the first-type index is used to indicate a CORESET Pool to which a CORESET configured by the given information block belongs.

In one embodiment, any of the M1 second-type indexes is used to indicate a TCI-StateId.

Embodiment 11

Figure 11:
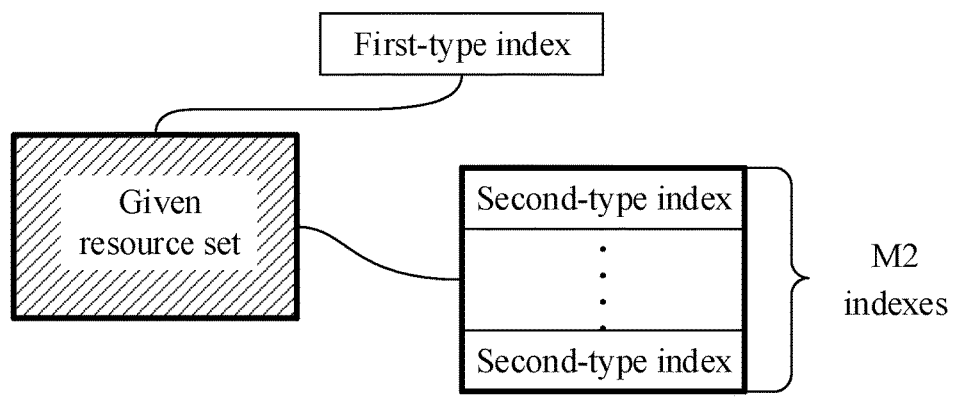
FIG. 11 illustrates a schematic diagram of a given resource set according to one embodiment of the present disclosure.

Embodiment 11 illustrates a schematic diagram of a given resource set, as shown in FIG. 11. In FIG. 11, the given resource set occupies more than one RE, the given resource set is associated with a first-type index, and the given resource set is associated with M2 second-type indexes, M2 being a positive integer greater than 1.

In one embodiment, the given resource set is a first resource set in the present disclosure.

In one embodiment, the given resource set is a second resource set in the present disclosure.

In one embodiment, the given resource set is configured by one of the K information blocks in the present disclosure.

In one embodiment, the M2 second-type indexes are used to indicate M2 reference signal resources.

In one subembodiment, a PDCCH transmitted in the given resource set is at least QCL with one reference signal resource out of the M2 reference signal resources.

In one subembodiment, any of the M2 reference signal resources can be configured to be QCL with a PDCCH transmitted in the given resource set.

In one embodiment, an information block configuring the given resource set is transmitted to the first node by either the target cell or the first candidate cell.

In one embodiment, both the target cell and the first candidate cell can transmit a PDCCH of the first node in the given resource set.

Embodiment 12

Figure 12:
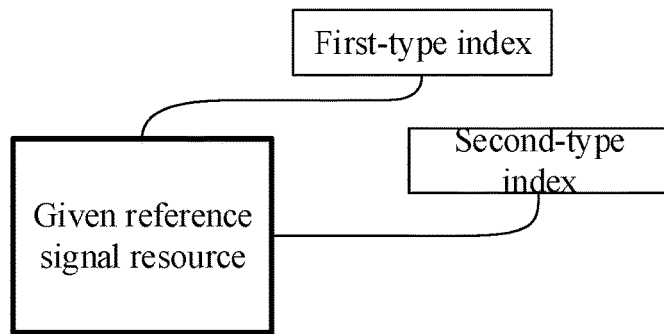
FIG. 12 illustrates a schematic diagram of a given reference signal resource according to one embodiment of the present disclosure.

Embodiment 12 illustrates a schematic diagram of a given reference signal resource, as shown in FIG. 12. In FIG. 12, a given reference signal resource is associated with a second-type index in the present disclosure, and the given reference signal resource is associated with a given cell.

In one embodiment, the given reference signal resource is used to transmit a CSI-RS.

In one embodiment, the given reference signal resource is used to transmit an SSB.

In one embodiment, the given reference signal resource is the first reference signal resource, and the given cell is the target cell.

In one embodiment, the given reference signal resource is the second reference signal resource, and the given cell is the first candidate cell.

Embodiment 13

Figure 13:
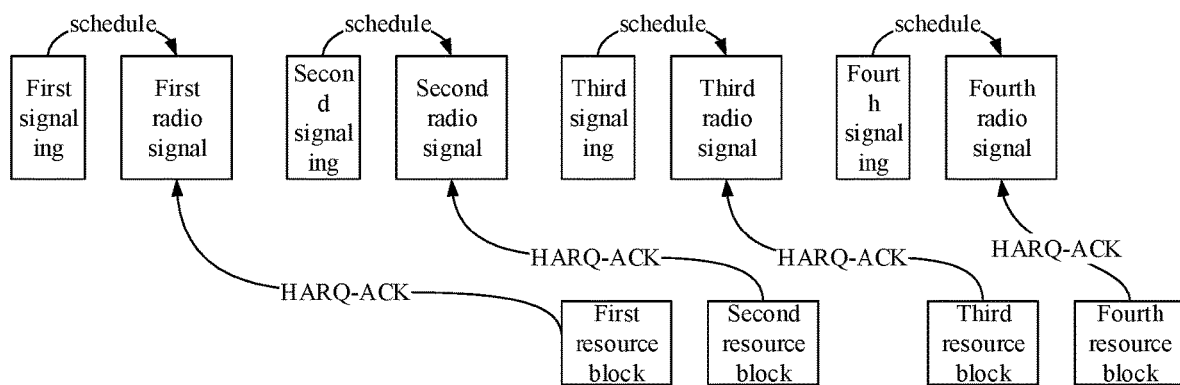
FIG. 13 illustrates a schematic diagram of first UCI according to one embodiment of the present disclosure.

Embodiment 13 illustrates a schematic diagram of first UCI, as shown in FIG. 13. In FIG. 13, the first UCI in the present disclosure does not comprise a HARQ-ACK associated with a second signaling, a first signaling in the figure is used to schedule a first radio signal and a first resource block is used for feeding back a HARQ-ACK for the first radio signal, and a second signaling in the figure is used to schedule a second radio signal and a second resource block is used for feeding back a HARQ-ACK for the second radio signal; besides, a third signaling in the figure is used to schedule a third radio signal and a third resource block is used for feeding back a HARQ-ACK for the third radio signal, and a fourth signaling in the figure is used to schedule a fourth radio signal and a fourth resource block is used for feeding back a HARQ-ACK for the fourth radio signal; in FIG. 13, the HARQ-ACK for the first radio signal and the HARQ-ACK for the third radio signal belong to a HARQ-ACK codebook, and the HARQ-ACK for the first radio signal and the HARQ-ACK for the third radio signal are both fed back in the third resource block; the HARQ-ACK for the second radio signal and the HARQ-ACK for the fourth radio signal belong to a HARQ-ACK codebook, and the HARQ-ACK for the second radio signal and the HARQ-ACK for the fourth radio signal are both fed back in the first UCI transmitted in the fourth resource block.

In one embodiment, the first resource block is not used for feeding back a HARQ-ACK for the first radio signal.

In one embodiment, the second resource block is not used for feeding back a HARQ-ACK for the second radio signal.

In one embodiment, the first resource block and the third resource block belong to a same slot.

In one embodiment, the second resource block and the fourth resource block belong to a same slot.

In one embodiment, the first resource block and the second resource block belong to a same slot.

In one embodiment, a time-domain resource occupied by the first resource block and a time-domain resource occupied by the third resource block are overlapping.

In one embodiment, a time-domain resource occupied by the first resource block and a time-domain resource occupied by the third resource block are orthogonal.

In one embodiment, a time-domain resource occupied by the second resource block and a time-domain resource occupied by the fourth resource block are overlapping.

In one embodiment, a time-domain resource occupied by the second resource block and a time-domain resource occupied by the fourth resource block are orthogonal.

In one embodiment, a time-domain resource occupied by the fourth resource block is the reference time-domain resource of the HARQ-ACK associated with the second signaling.

Embodiment 14

Figure 14:
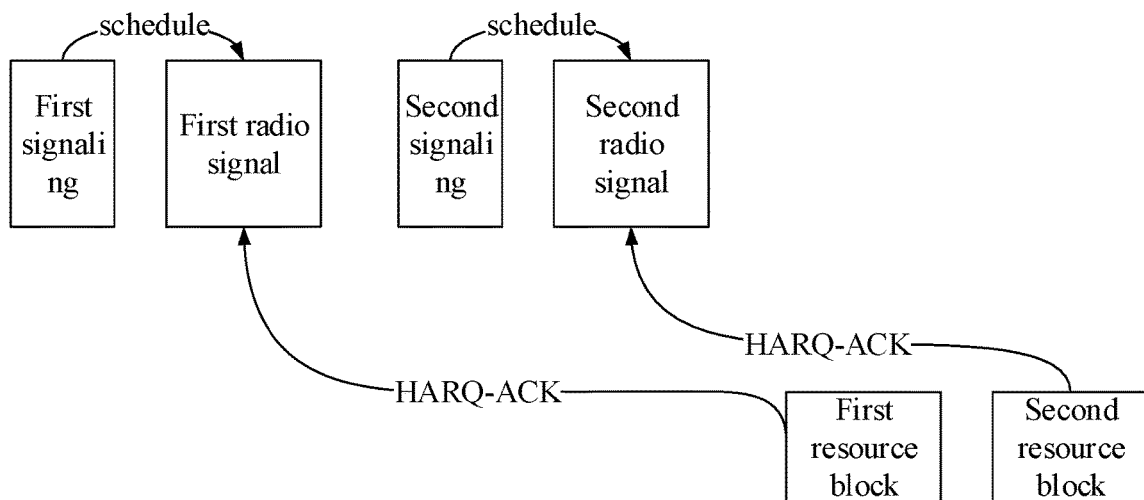
FIG. 14 illustrates a schematic diagram of first UCI according to another embodiment of the present disclosure.

Embodiment 14 illustrates another schematic diagram of first UCI, as shown in FIG. 14. In FIG. 14, the first UCI in the present disclosure comprises a HARQ-ACK associated with the second signaling, a first signaling in the figure is used to schedule a first radio signal and a first resource block is used for feeding back a HARQ-ACK for the first radio signal, and a second signaling in the figure is used to schedule a second radio signal and a second resource block is used for feeding back a HARQ-ACK for the second radio signal; in FIG. 14, the HARQ-ACK for the first radio signal and the HARQ-ACK for the second radio signal belong to a HARQ-ACK codebook, and the HARQ-ACK for the first radio signal and the HARQ-ACK for the second radio signal are both fed back in the second resource block.

In one embodiment, the first resource block is not used for feeding back a HARQ-ACK for the first radio signal.

In one embodiment, the first resource block and the second resource block belong to a same slot.

In one embodiment, a time-domain resource occupied by the first resource block and a time-domain resource occupied by the second resource block are overlapping.

In one embodiment, a time-domain resource occupied by the first resource block and a time-domain resource occupied by the second resource block are orthogonal.

In one embodiment, a time-domain resource occupied by the second resource block is the reference time-domain resource of the HARQ-ACK associated with the second signaling.

Embodiment 15

Figure 15:
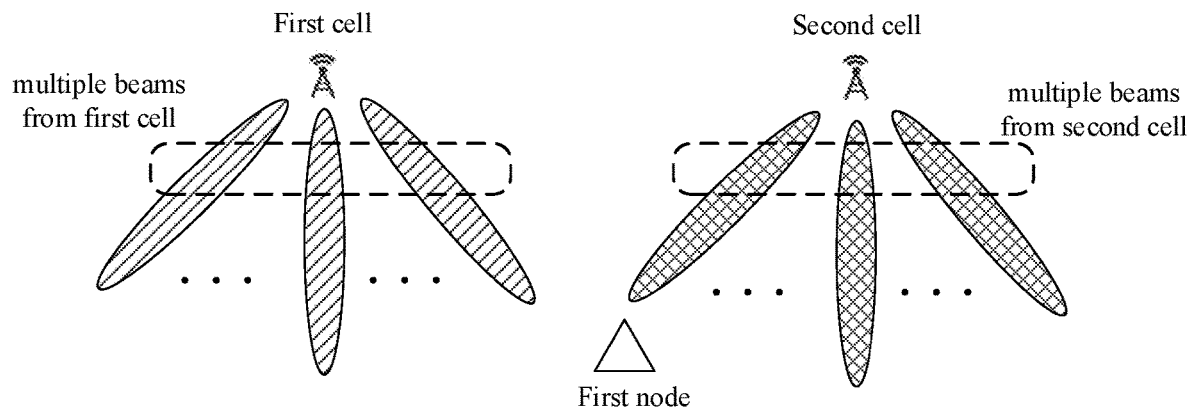
FIG. 15 illustrates a schematic diagram of an application scenario according to one embodiment of the present disclosure.

Embodiment 15 illustrates a schematic diagram of an application scenario, as shown in FIG. 15. In FIG. 15, the first resource set and the second resource set are simultaneously configured to the first node by a first cell in the figure, while the second cell is a neighbor cell of the first cell; no L3 handover occurs as the first node moves from the first cell to the second cell; when the first node receives the first signaling and the second signaling respectively in the first resource set and the second resource set, the first node needs to determine whether a HARQ-ACK associated with the first signaling and a HARQ-ACK associated with the second signaling can adopt a same HARQ-ACK codebook.

In one embodiment, the first cell corresponds to the target cell in the present disclosure, and the second cell corresponds to the first candidate cell in the present disclosure.

In one embodiment, the first node can hardly determine by which cells the first signaling and the second signaling are to be transmitted respectively.

In one embodiment, both the first resource set and the second resource set can be used by the first cell for transmission of a PDCCH.

In one embodiment, both the first resource set and the second resource set can be used by the second cell for transmission of a PDCCH.

In one embodiment, when a second-type index for activating the first resource set and a second-type index for activating the second resource set respectively belong to the first cell and the second cell, it is shown that the first signaling and the second signaling are transmitted respectively employing beams of the first cell and beams of the second cell, thus a HARQ-ACK associated with the first signaling and a HARQ-ACK associated with the second signaling cannot adopt a same HARQ-ACK codebook.

In one embodiment, when a second-type index for activating the first resource set and a second-type index for activating the second resource set simultaneously belong to the first cell or the second cell, it is shown that the first signaling and the second signaling are transmitted employing the same beams of a same cell, thus a HARQ-ACK associated with the first signaling and a HARQ-ACK associated with the second signaling can adopt a same HARQ-ACK codebook.

Embodiment 16

Figure 16:
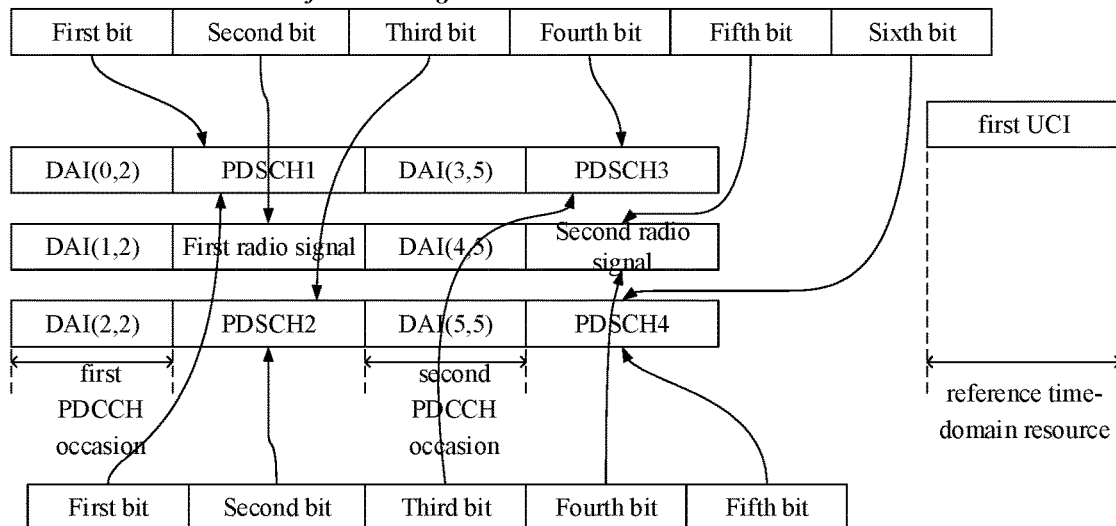
FIG. 16 illustrates a schematic diagram of the first field in the first signaling and the second field in the second signaling according to one embodiment of the present disclosure.

Embodiment 16 illustrates a schematic diagram of the first field in the first signaling and the second field in the second signaling, as shown in FIG. 16. In FIG. 16, a time-domain resource occupied by the first signaling is located in a first PDCCH Occasion, the first PDCCH Occasion also comprises a PDCCH1 and a PDCCH2, the first field in the first signaling comprises a first sub-field and a third sub-field, and a DAI field in the PDCCH1 is equal to (0, 2), where 0 is a Counter-DAI and 2 is a Total-DAI; the first field in the first signaling is equal to (1, 2), where 1 is the third sub-field and is a Counter-DAI, and 2 is the first sub-field and is a Total-DAI; a DAI field in the PDCCH2 is equal to (2, 2), where the 2 respectively refer to a Counter-DAI and a Total-DAI; the PDCCH1 is used to schedule a PDSCH1, while the PDCCH2 is used to schedule a PDSCH2, and the first signaling is used to schedule the first radio signal; a time-domain resource occupied by the second signaling is located in a second PDCCH Occasion, the second PDCCH Occasion also comprises a PDCCH3 and a PDCCH4, the first field in the second signaling comprises a second sub-field and a fourth sub-field, and a DAI field in the PDCCH3 is equal to (3, 5), where 3 is a Counter-DAI and 5 is a Total-DAI; the first field in the second signaling is equal to (4, 5), where 4 is the fourth sub-field and is a Counter-DAI, and 5 is the second sub-field and is a Total-DAI; a DAI field in the PDCCH4 is equal to (5, 5), where the 5 respectively refer to a Counter-DAI and a Total-DAI; the PDCCH3 is used to schedule a PDSCH3, while the PDCCH4 is used to schedule a PDSCH4, and the second signaling is used to schedule the second radio signal; a HARQ-ACK for the PDSCH1, a HARQ-ACK for the first radio signal, a HARQ-ACK for the PDSCH2, a HARQ-ACK for the PDSCH3, a HARQ-ACK for the second radio signal and a HARQ-ACK for the PDSCH4 are all fed back in the reference time-domain resource in the present disclosure.

In one embodiment, the first UCI comprises a HARQ-ACK for the first radio signal, and the first field in the first signaling is used to determine a position of a bit used to indicate the HARQ-ACK for the first radio signal in the first UCI.

In one subembodiment, the first field in the first signaling is used to determine a number of HARQ-ACK bits comprised in the first UCI.

In one subembodiment, the first UCI comprises a HARQ-ACK for the first radio signal, and the first UCI comprises 6 HARQ-ACK bits, of which a second bit is used to indicate the HARQ-ACK for the first radio signal.

In one embodiment, the first UCI does not comprise a HARQ-ACK for the first radio signal, and the first field in the first signaling is not used to determine a position of a bit used to indicate the HARQ-ACK for the first radio signal in the first UCI.

In one subembodiment, the second field in the second signaling is used to determine a number of HARQ-ACK bits comprised in the first UCI.

In one subembodiment, the second field in the second signaling is used to determine a position of a bit used to indicate the HARQ-ACK for the second radio signal in the first UCI.

In one subembodiment, the first UCI does not comprise a HARQ-ACK for the first radio signal, and the first UCI comprises 5 HARQ-ACK bits, the 5 bits being respectively used for indicating a HARQ-ACK for the PDSCH1, a HARQ-ACK for the PDSCH2, a HARQ-ACK for the PDSCH3, a HARQ-ACK for the second radio signal and a HARQ-ACK for the PDSCH4.

Embodiment 17

Figure 17:
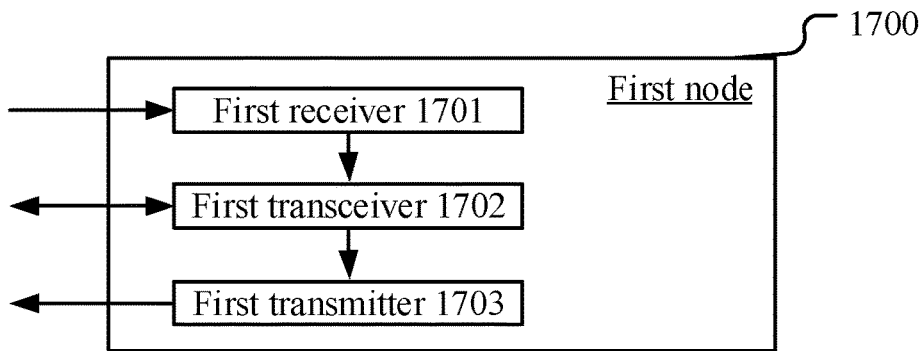
FIG. 17 illustrates a structure block diagram of a processing device in a first node according to one embodiment of the present disclosure.

Embodiment 17 illustrates a structure block diagram of a processing device in a first node, as shown in FIG. 17. In FIG. 17, a first node 1700 comprises a first receiver 1701, a first transceiver 1702 and a first transmitter 1703.

The first receiver 1701 receives K information blocks, K being a positive integer greater than 1, each of the K information blocks comprises a first-type index and at least one second-type index, and each of the K information blocks is used for indicating a resource set.

The first transceiver 1702 receives a first signaling and a second signaling respectively in a first resource set and a second resource set; the first resource set is the resource set indicated by a first information block, the first information block being one of the K information blocks, and the second resource set is the resource set indicated by a second information block, the second information block being one of the K information blocks other than the first information block.

The first transmitter 1703 transmits first UCI in a physical layer channel on a first cell, the first cell being capable of bearing a HARQ-ACK associated with the first signaling.

In Embodiment 17, the first-type index's name comprises CORESETPoolIndex; any said second-type index comprised in the K information blocks indicates a reference signal resource; a Demodulation Reference Signal (DMRS) of a channel occupied by the first signaling and a first reference signal resource are quasi co-located (QCL), and one said second-type index comprised in the first information block indicates the first reference signal resource; a DMRS of a channel occupied by the second signaling and a second reference signal resource are QCL, and one said second-type index comprised in the second information block indicates the second reference signal resource; the first reference signal resource is associated with a target cell, while the second reference signal resource is associated with a first candidate cell; the first UCI comprises a HARQ-ACK associated with a second signaling, the first-type index indicated by the first information block and the target cell are jointly used to determine whether the first UCI comprises the HARQ-ACK associated with the first signaling; the first signaling comprises a first field, and the second signaling comprises a second field; the second field in the second signaling is used to determine a number of HARQ-ACK bits that are comprised in the first UCI; whether the first field in the first signaling is used to determine the number of the HARQ-ACK bits that are comprised in the first UCI depends on the first-type index indicated by the first information block and the target cell.

In one embodiment, the first transceiver 1702 receives a third information block, the third information block being used to indicate a said second-type index comprised in the first information block.

In one embodiment, the first transceiver 1702 transmits a first uplink (UL) information block, the UL information block being used to indicate a said second-type index comprised in the first information block.

In one embodiment, the first transceiver 1702 receives a fourth information block, the fourth information being used to indicate a said second-type index comprised in the second information block.

In one embodiment, the first transceiver 1702 transmits a second UL information block, the second UL information block being used to indicate a said second-type index comprised in the second information block.

In one embodiment, the first transceiver 1702 receives a first radio signal; the first signaling comprises configuration information of the first radio signal; the HARQ-ACK associated with the first signaling indicates whether a bit block carried by the first radio signal is correctly decoded.

In one embodiment, the first transceiver 1702 receives a second radio signal; second signaling comprises configuration information of the second radio signal; the HARQ-ACK associated with the second signaling indicates whether a bit block carried by the second radio signal is correctly decoded.

In one embodiment, a time-domain resource occupied by the first UCI is a reference time-domain resource of a HARQ-ACK associated with the second signaling.

In one embodiment, the first-type index comprised in the first information block is the same as the first-type index comprised in the second information block; all conditions in a first condition set being fulfilled is used to determine that the first field in the first signaling is not used to determine the number of the HARQ-ACK bits comprised in the first UCI; the first condition set comprises: the first candidate cell is different from the target cell.

In one embodiment, the first condition set comprises: there aren't two information blocks among the K information blocks that respectively comprise two second-type indexes indicating a same reference signal resource associated with the target cell, with the first-type indexes respectively comprised in the two information blocks being different.

In one embodiment, the first-type index comprised in the first information block is the same as the first-type index comprised in the second information block; all conditions in a first condition set being fulfilled is used to determine that the first field in the first signaling is not used to determine the number of the HARQ-ACK bits comprised in the first UCI; the first condition set comprises: the first candidate cell is different from the target cell; and HARQ-ACKs associated with all downlink physical layer signalings of the target cell are not fed back respectively.

In one embodiment, an offset between reception of the first signaling and the first radio signal is smaller than a first offset value; a DMRS comprised by the first radio signal and a DMRS comprised by a control resource set with a minimum control resource set index in a first target control resource set pool are QCL; the first target control resource set pool comprises a control resource set indicated by any information block in a first information block subset; the first information block subset comprises a first target information block, and the first target information block is any one of information blocks that fulfill a first target condition set among the K information blocks; the first target condition set comprises that a first-type index comprised in the first target information block is the same as the first-type index comprised in the first information block; and the first target condition set comprises that the first target information block comprises at least one second-type index, and a reference signal resource indicated by the second-type index comprised in the first target information block is associated with the target cell.

In one embodiment, the first-type index comprised in the first information block is different from the first-type index comprised in the second information block; all conditions in a second condition set being fulfilled is used to determine that the first field in the first signaling is used to determine the number of the HARQ-ACK bits comprised in the first UCI; the second condition set comprises: the first candidate cell is the same as the target cell.

In one embodiment, the second condition set comprises: there are two information blocks among the K information blocks that respectively comprise two second-type indexes indicating a same reference signal resource associated with the target cell, with the first-type indexes respectively comprised in the two information blocks being different.

In one embodiment, an offset between reception of the first signaling and the first radio signal is smaller than a first offset value; a DMRS comprised by the first radio signal and a DMRS comprised by a control resource set with a minimum control resource set index in a second target control resource set pool are QCL; the second target control resource set pool comprises a control resource set indicated by any information block in a second information block subset; the second information block subset comprises a second target information block, and the second target information block is any one of information blocks that fulfill a second target condition set among the K information blocks; the second target condition set comprises that the second target information block comprises at least one second-type index, and a reference signal resource indicated by the second-type index comprised in the second target information block is associated with the target cell.

In one embodiment, the first receiver 1701 receives a fifth information block, when the first UCI does not comprise the HARQ-ACK associated with the first signaling, the first transmitter 1703 transmits target UCI in a target time-domain resource set; the fifth information block is used to determine a position of a time-domain resource occupied by the target time-domain resource set, and the target UCI comprises the HARQ-ACK associated with the first signaling; a time-domain resource occupied by the target time-domain resource set and a time-domain resource occupied by the first UCI are orthogonal; the first field in the first signaling is used to determine a number of HARQ-ACK bits that are comprised in the target UCI.

In one embodiment, the first receiver 1701 comprises at least the first four of the antenna 452, the receiver 454, the multi-antenna receiving processor 458, the receiving processor 456 and the controller/processor 459 in Embodiment 4.

In one embodiment, the first transceiver 1702 comprises at least the first six of the antenna 452, the receiver/transmitter 454, the multi-antenna receiving processor 458, the multi-antenna transmitting processor 457, the receiving processor 456, the transmitting processor 468 and the controller/processor 459 in Embodiment 4.

In one embodiment, the first transmitter 1703 comprises at least the first four of the antenna 452, the transmitter 454, the multi-antenna transmitting processor 457, the transmitting processor 468 and the controller/processor 459 in Embodiment 4.

Embodiment 18

Figure 18:
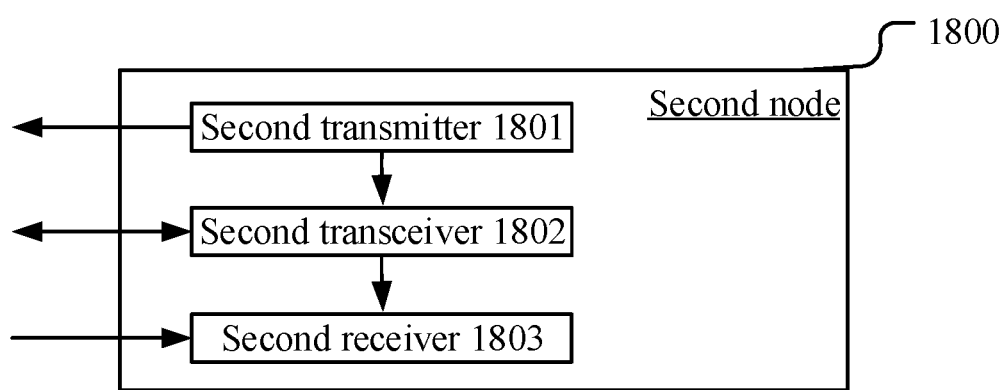
FIG. 18 illustrates a structure block diagram of a processing device in a second node according to one embodiment of the present disclosure.

Embodiment 18 illustrates a structure block diagram of a processing device in a second node, as shown in FIG. 18. In FIG. 18, a second node 1800 comprises a second transmitter 1801, a second transceiver 1802 and a second receiver 1803.

The second transmitter 1801 transmits K information blocks, K being a positive integer greater than 1, each of the K information blocks comprises a first-type index and at least one second-type index, and each of the K information blocks is used for indicating a resource set.

The second transceiver 1802 transmits a first signaling and a second signaling respectively in a first resource set and a second resource set; the first resource set is the resource set indicated by a first information block, the first information block being one of the K information blocks, and the second resource set is the resource set indicated by a second information block, the second information block being one of the K information blocks other than the first information block.

The second receiver 1803 receives first UCI in a physical layer channel on a first cell, the first cell being capable of bearing a HARQ-ACK associated with the first signaling.

In Embodiment 18, the first-type index's name comprises CORESETPoolIndex; any said second-type index comprised in the K information blocks indicates a reference signal resource; a Demodulation Reference Signal (DMRS) of a channel occupied by the first signaling and a first reference signal resource are quasi co-located (QCL), and one said second-type index comprised in the first information block indicates the first reference signal resource; a DMRS of a channel occupied by the second signaling and a second reference signal resource are QCL, and one said second-type index comprised in the second information block indicates the second reference signal resource; the first reference signal resource is associated with a target cell, while the second reference signal resource is associated with a first candidate cell; the first UCI comprises a HARQ-ACK associated with a second signaling, the first-type index indicated by the first information block and the target cell are jointly used to determine whether the first UCI comprises the HARQ-ACK associated with the first signaling; the first signaling comprises a first field, and the second signaling comprises a second field; the second field in the second signaling is used to determine a number of HARQ-ACK bits that are comprised in the first UCI; whether the first field in the first signaling is used to determine the number of the HARQ-ACK bits that are comprised in the first UCI depends on the first-type index indicated by the first information block and the target cell.

In one embodiment, the second transceiver 1802 transmits a third information block, the third information block being used to indicate a said second-type index comprised in the first information block.

In one embodiment, the second transceiver 1802 receives a first uplink (UL) information block, the UL information block being used to indicate a said second-type index comprised in the first information block.

In one embodiment, the second transceiver 1802 transmits a fourth information block, the fourth information being used to indicate a said second-type index comprised in the second information block.

In one embodiment, the second transceiver 1802 receives a second UL information block, the second UL information block being used to indicate a said second-type index comprised in the second information block.

In one embodiment, the second transceiver 1802 transmits a first radio signal; the first signaling comprises configuration information of the first radio signal; the HARQ-ACK associated with the first signaling indicates whether a bit block carried by the first radio signal is correctly decoded.

In one embodiment, the second transceiver 1802 transmits a second radio signal; second signaling comprises configuration information of the second radio signal; the HARQ-ACK associated with the second signaling indicates whether a bit block carried by the second radio signal is correctly decoded.

In one embodiment, a time-domain resource occupied by the first UCI is a reference time-domain resource of a HARQ-ACK associated with the second signaling.

In one embodiment, the first-type index comprised in the first information block is the same as the first-type index comprised in the second information block; all conditions in a first condition set being fulfilled is used to determine that the first field in the first signaling is not used to determine the number of the HARQ-ACK bits comprised in the first UCI; the first condition set comprises: the first candidate cell is different from the target cell.

In one embodiment, the first condition set comprises: there aren't two information blocks among the K information blocks that respectively comprise two second-type indexes indicating a same reference signal resource associated with the target cell, with the first-type indexes respectively comprised in the two information blocks being different.

In one embodiment, the first-type index comprised in the first information block is the same as the first-type index comprised in the second information block; all conditions in a first condition set being fulfilled is used to determine that the first field in the first signaling is not used to determine the number of the HARQ-ACK bits comprised in the first UCI; the first condition set comprises: the first candidate cell is different from the target cell; and HARQ-ACKs associated with all downlink physical layer signalings of the target cell are not fed back respectively.

In one embodiment, an offset between reception of the first signaling and the first radio signal is smaller than a first offset value; a DMRS comprised by the first radio signal and a DMRS comprised by a control resource set with a minimum control resource set index in a first target control resource set pool are QCL; the first target control resource set pool comprises a control resource set indicated by any information block in a first information block subset; the first information block subset comprises a first target information block, and the first target information block is any one of information blocks that fulfill a first target condition set among the K information blocks; the first target condition set comprises that a first-type index comprised in the first target information block is the same as the first-type index comprised in the first information block; and the first target condition set comprises that the first target information block comprises at least one second-type index, and a reference signal resource indicated by the second-type index comprised in the first target information block is associated with the target cell.

In one embodiment, the first-type index comprised in the first information block is different from the first-type index comprised in the second information block; all conditions in a second condition set being fulfilled is used to determine that the first field in the first signaling is used to determine the number of the HARQ-ACK bits comprised in the first UCI; the second condition set comprises: the first candidate cell is the same as the target cell.

In one embodiment, the second condition set comprises: there are two information blocks among the K information blocks that respectively comprise two second-type indexes indicating a same reference signal resource associated with the target cell, with the first-type indexes respectively comprised in the two information blocks being different.

In one embodiment, an offset between reception of the first signaling and the first radio signal is smaller than a first offset value; a DMRS comprised by the first radio signal and a DMRS comprised by a control resource set with a minimum control resource set index in a second target control resource set pool are QCL; the second target control resource set pool comprises a control resource set indicated by any information block in a second information block subset; the second information block subset comprises a second target information block, and the second target information block is any one of information blocks that fulfill a second target condition set among the K information blocks; the second target condition set comprises that the second target information block comprises at least one second-type index, and a reference signal resource indicated by the second-type index comprised in the second target information block is associated with the target cell.

In one embodiment, the second transmitter 1801 transmits a fifth information block; when the first UCI does not comprise the HARQ-ACK associated with the first signaling, the second receiver 1803 receives target UCI in a target time-domain resource set; the fifth information block is used to determine a position of a time-domain resource occupied by the target time-domain resource set, and the target UCI comprises the HARQ-ACK associated with the first signaling; a time-domain resource occupied by the target time-domain resource set and a time-domain resource occupied by the first UCI are orthogonal.

In one embodiment, the second transmitter 1801 comprises at least the first four of the antenna 420, the transmitter 418, the multi-antenna transmitting processor 471, the transmitting processor 416 and the controller/processor 475 in Embodiment 4.

In one embodiment, the second transceiver 1802 comprises at least the first six of the antenna 420, the transmitter/receiver 418, the multi-antenna transmitting processor 471, the multi-antenna receiving processor 472, the transmitting processor 416, the receiving processor 470 and the controller/processor 475 in Embodiment 4.

In one embodiment, the second receiver 1803 comprises at least the first four of the antenna 420, the receiver 418, the multi-antenna receiving processor 472, the receiving processor 470 and the controller/processor 475 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node in the present disclosure includes but is not limited to mobile phones, tablet computers, notebooks, network cards, low-consumption equipment, enhanced MTC (eMTC) terminals, NB-IOT terminals, vehicle-mounted communication equipment, vehicles, automobiles, RSU, aircrafts, airplanes, unmanned aerial vehicles, telecontrolled aircrafts, etc. The second node in the present disclosure includes but is not limited to macro-cellular base stations, micro-cellular base stations, home base stations, relay base station, eNB, gNB, Transmitter Receiver Point (TRP), GNSS, relay satellite, satellite base station, airborne base station, RSU, unmanned ariel vehicle, test equipment like transceiving device simulating partial functions of base station or signaling tester, and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, receiving K information blocks, K being a positive integer greater than 1, each of the K information blocks comprises a first-type index and at least one second-type index, and each of the K information blocks is used for indicating a resource set;
a first transceiver, receiving a first signaling and a second signaling respectively in a first resource set and a second resource set; the first resource set is the resource set indicated by a first information block, the first information block being one of the K information blocks, and the second resource set is the resource set indicated by a second information block, the second information block being one of the K information blocks other than the first information block; and
a first transmitter, transmitting first UCI in a physical layer channel on a first cell, the first cell being capable of bearing a HARQ-ACK associated with the first signaling;
wherein the first-type index's name comprises CORESETPoolIndex; any said second-type index comprised in the K information blocks indicates a reference signal resource; a Demodulation Reference Signal (DMRS) of a channel occupied by the first signaling and a first reference signal resource are quasi co-located (QCL), and one said second-type index comprised in the first information block indicates the first reference signal resource; a DMRS of a channel occupied by the second signaling and a second reference signal resource are QCL, and one said second-type index comprised in the second information block indicates the second reference signal resource; the first reference signal resource is associated with a target cell, while the second reference signal resource is associated with a first candidate cell; the first UCI comprises a HARQ-ACK associated with a second signaling, the first-type index indicated by the first information block and the target cell are jointly used to determine whether the first UCI comprises the HARQ-ACK associated with the first signaling; the first signaling comprises a first field, and the second signaling comprises a second field; the second field in the second signaling is used to determine a number of HARQ-ACK bits that are comprised in the first UCI; whether the first field in the first signaling is used to determine the number of the HARQ-ACK bits that are comprised in the first UCI depends on the first-type index indicated by the first information block and the target cell; the K information blocks are respectively used to indicate K Control Resource Sets (CORESETs), the first resource set comprises a CORESET, the second resource set comprises a CORESET; the first signaling is Downlink Control Information (DCI), and the first field in the first signaling is a Downlink Assignment Index (DAI) in the DCI; the second signaling is DCI, and the second field in the second signaling is a DAI in the DCI.

2. The first node according to claim 1, wherein the first transceiver receives a first radio signal and a second radio signal; the first signaling comprises configuration information of the first radio signal, and the HARQ-ACK associated with the first signaling indicates whether a bit block carried by the first radio signal is correctly decoded; the second signaling comprises configuration information of the second radio signal, and the HARQ-ACK associated with the second signaling indicates whether a bit block carried by the second radio signal is correctly decoded.

3. The first node according to claim 1, wherein a time-domain resource occupied by the first UCI is a reference time-domain resource for a HARQ-ACK associated with the second signaling.

4. The first node according to claim 1, wherein a physical layer channel for transmitting the first signaling comprises a Physical Downlink Control Channel (PDCCH), a physical layer channel for transmitting the second signaling comprises a PDCCH.

5. The first node according to claim 4, wherein the second-type index comprises a TCI-StateId.

6. The first node according to claim 4, wherein the first information block comprises Q1 second-type indexes, Q1 being a positive integer greater than 1 and not greater than 64; the second information block comprises Q2 second-type indexes, Q2 being a positive integer greater than 1 and not greater than 64.

7. The first node according to claim 2, wherein an offset between reception of the first signaling and the first radio signal is smaller than a first offset value; a DMRS comprised by the first radio signal and a DMRS comprised by a control resource set with a minimum control resource set index in a first target control resource set pool are QCL; the first target control resource set pool comprises a control resource set indicated by any information block in a first information block subset; the first information block subset comprises a first target information block, and the first target information block is any one of information blocks that fulfill a first target condition set among the K information blocks; the first target condition set comprises that a first-type index comprised in the first target information block is the same as the first-type index comprised in the first information block; and the first target condition set comprises that the first target information block comprises at least one second-type index, and a reference signal resource indicated by the second-type index comprised in the first target information block is associated with the target cell.

8. The first node according to claim 1, wherein the reference signal resource indicated by the second-type index comprises at least one of a Channel State Information-Reference Signal (CSI-RS) resource or a Synchronization Signal/physical broadcast channel Block (SSB).

9. The first node according to claim 8, wherein the phrase that one said second-type index comprised in the first information block indicates the first reference signal resource means that the first information block comprises multiple TCI-States, and one of the multiple TCI-States indicates the first reference signal resource.

10. The first node according to claim 8, wherein the phrase that one said second-type index comprised in the second information block indicates the second reference signal resource means that the second information block comprises multiple TCI-States, and one of the multiple TCI-States indicates the second reference signal resource.

11. The first node according to claim 1, wherein the first receiver receives a fifth information block, when the first UCI does not comprise the HARQ-ACK associated with the first signaling, the first transmitter transmits target UCI in a target time-domain resource set; the fifth information block is used to determine a position of a time-domain resource occupied by the target time-domain resource set, and the target UCI comprises the HARQ-ACK associated with the first signaling; a time-domain resource occupied by the target time-domain resource set and a time-domain resource occupied by the first UCI are orthogonal; the first field in the first signaling is used to determine a number of HARQ-ACK bits that are comprised in the target UCI.

12. The first node according to claim 1, wherein when the first-type index indicated by the first information block is different from a second-type index comprised in the second information block and the first candidate cell is different from the target cell, the first field in the first signaling is not used to determine the number of the HARQ-ACK bits comprised in the first UCI.

13. The first node according to claim 1, wherein when the first-type index indicated by the first information block is the same as a second-type index comprised in the second information block and the first candidate cell is the same as the target cell, the first field in the first signaling is used to determine the number of the HARQ-ACK bits comprised in the first UCI.

14. The first node according to claim 1, wherein the first reference signal resource comprises at least one of a CSI-RS resource or an SSB, the second reference signal resource comprises at least one of a CSI-RS resource or an SSB.

15. The first node according to claim 1, wherein the first UCI is transmitted on a PUCCH, or the first UCI is transmitted on a PUSCH.

16. The first node according to claim 1, wherein when the first UCI comprises the HARQ-ACK associated with the first signaling, the first field in the first signaling and the second field in the second signaling are jointly used to determine the number of the HARQ-ACK bits comprised in the first UCI; when the first UCI does not comprise the HARQ-ACK associated with the first signaling, of the first field in the first signaling and the second field in the second signaling only the second field in the second signaling is used to determine the number of the HARQ-ACK bits comprised in the first UCI.

17. The first node according to claim 1, wherein the phrase that the first reference signal resource is associated with a target cell means at least one of the following:
  the first reference signal resource and an SSB transmitted by the target cell are QCL;
  configuration information of the first reference signal resource comprises a cell ID of the target cell, where the cell ID comprises a PCI;
  a cell ID of the target cell is used to generate a reference signal sequence in the first reference signal resource.

18. The first node according to claim 1, wherein the phrase that the second reference signal resource is associated with a first candidate cell means at least one of the following:
  the second reference signal resource and an SSB transmitted by the first candidate cell are QCL;
  configuration information of the second reference signal resource comprises a cell ID of the first candidate cell, where the cell ID comprises a PCI;
  a cell ID of the first candidate cell is used to generate a reference signal sequence in the second reference signal resource.

19. A second node for wireless communications, comprising:
  a second transmitter, transmitting K information blocks, K being a positive integer greater than 1, each of the K information blocks comprises a first-type index and at least one second-type index, and each of the K information blocks is used for indicating a resource set;
  a second transceiver, transmitting a first signaling and a second signaling respectively in a first resource set and a second resource set; the first resource set is the resource set indicated by a first information block, the first information block being one of the K information blocks, and the second resource set is the resource set indicated by a second information block, the second information block being one of the K information blocks other than the first information block; and
  a second receiver, receiving first UCI in a physical layer channel on a first cell, the first cell being capable of bearing a HARQ-ACK associated with the first signaling;
  wherein the first-type index's name comprises CORESETPoolIndex; any said second-type index comprised in the K information blocks indicates a reference signal resource; a Demodulation Reference Signal (DMRS) of a channel occupied by the first signaling and a first reference signal resource are quasi co-located (QCL), and one said second-type index comprised in the first information block indicates the first reference signal resource; a DMRS of a channel occupied by the second signaling and a second reference signal resource are QCL, and one said second-type index comprised in the second information block indicates the second reference signal resource; the first reference signal resource is associated with a target cell, while the second reference signal resource is associated with a first candidate cell; the first UCI comprises a HARQ-ACK associated with a second signaling, the first-type index indicated by the first information block and the target cell are jointly used to determine whether the first UCI comprises the HARQ-ACK associated with the first signaling; the first signaling comprises a first field, and the second signaling comprises a second field; the second field in the second signaling is used to determine a number of HARQ-ACK bits that are comprised in the first UCI; whether the first field in the first signaling is used to determine the number of the HARQ-ACK bits that are comprised in the first UCI depends on the first-type index indicated by the first information block and the target cell; the K information blocks are respectively used to indicate K Control Resource Sets (CORESETs), the first resource set comprises a CORESET, the second resource set comprises a CORESET; the first signaling is Downlink Control Information (DCI), and the first field in the first signaling is a Downlink Assignment Index (DAI) in the DCI; the second signaling is DCI, and the second field in the second signaling is a DAI in the DCI.

20. A method in a first node for wireless communications, comprising:
  receiving K information blocks, K being a positive integer greater than 1, each of the K information blocks comprises a first-type index and at least one second-type index, and each of the K information blocks is used for indicating a resource set;
  receiving a first signaling and a second signaling respectively in a first resource set and a second resource set; the first resource set is the resource set indicated by a first information block, the first information block being one of the K information blocks, and the second resource set is the resource set indicated by a second information block, the second information block being one of the K information blocks other than the first information block; and
  transmitting first UCI in a physical layer channel on a first cell, the first cell being capable of bearing a HARQ-ACK associated with the first signaling;
  wherein the first-type index's name comprises CORESETPoolIndex; any said second-type index comprised in the K information blocks indicates a reference signal resource; a Demodulation Reference Signal (DMRS) of a channel occupied by the first signaling and a first reference signal resource are quasi co-located (QCL), and one said second-type index comprised in the first information block indicates the first reference signal resource; a DMRS of a channel occupied by the second signaling and a second reference signal resource are QCL, and one said second-type index comprised in the second information block indicates the second reference signal resource; the first reference signal resource is associated with a target cell, while the second reference signal resource is associated with a first candidate cell; the first UCI comprises a HARQ-ACK associated with a second signaling, the first-type index indicated by the first information block and the target cell are jointly used to determine whether the first UCI comprises the HARQ-ACK associated with the first signaling; the first signaling comprises a first field, and the second signaling comprises a second field; the second field in the second signaling is used to determine a number of HARQ-ACK bits that are comprised in the first UCI; whether the first field in the first signaling is used to determine the number of the HARQ-ACK bits that are comprised in the first UCI depends on the first-type index indicated by the first information block and the target cell; the K information blocks are respectively used to indicate K Control Resource Sets (CORESETs), the first resource set comprises a CORESET, the second resource set comprises a CORESET; the first signaling is Downlink Control Information (DCI), and the first field in the first signaling is a Downlink Assignment Index (DAI) in the DCI; the second signaling is DCI, and the second field in the second signaling is a DAI in the DCI.

\* \* \* \* \*